US005945742A

United States Patent [19]

Araki et al.

[11] Patent Number: 5,945,742

[45] Date of Patent: Aug. 31, 1999

[54] STARTER HAVING A PINION MOVEMENT CONTROL STRUCTURE

[75] Inventors: Takeshi Araki, Nishikasugai-gun; Keiichi Matsushima, Toyota; Masahiro Soh, Anjo, all of Japan

[73] Assignee: Denso Corporation, Kariya, Japan

[21] Appl. No.: 08/877,332

[22] Filed: Jun. 17, 1997

[30] Foreign Application Priority Data

| | | | |
|---|---|---|---|
| Jul. 10, 1996 | [JP] | Japan | 8-180243 |
| Aug. 6, 1996 | [JP] | Japan | 8-207459 |
| Aug. 19, 1996 | [JP] | Japan | 8-217170 |
| Oct. 29, 1996 | [JP] | Japan | 8-286244 |

[51] Int. Cl.[6] ............ F02N 11/00; H02P 9/04

[52] U.S. Cl. ............ 290/38 R; 290/38 A; 290/38 C; 290/40 R; 290/40 A; 74/7 A; 74/7 E

[58] Field of Search ............ 290/38 R, 48, 290/38 A, 38 C; 74/7 A, 7 E; 310/198, 237, 75 R

[56] References Cited

U.S. PATENT DOCUMENTS

| | | | |
|---|---|---|---|
| 1,870,367 | 8/1932 | Kearney | 74/7 |
| 3,465,353 | 9/1969 | Buxton | 74/7 |
| 3,599,496 | 8/1971 | Toulier | 74/7 |
| 3,875,805 | 4/1975 | Toulier | 74/7 |
| 4,902,905 | 2/1990 | Morishita | 290/48 |
| 5,129,271 | 7/1992 | Isozumi et al. | 74/7 R |
| 5,540,110 | 7/1996 | Zenmei et al. | 74/7 A |
| 5,610,445 | 3/1997 | Shiga et al. | 290/38 R |
| 5,625,242 | 4/1997 | Shiga et al. | 290/38 R |
| 5,698,914 | 12/1997 | Shiga | 290/38 R |
| 5,765,439 | 6/1998 | Araki et al. | 74/7 R |
| 5,767,585 | 6/1998 | Shiga | 290/38 R |
| 5,777,393 | 7/1998 | Katoh et al. | 290/48 |

FOREIGN PATENT DOCUMENTS

| | | | |
|---|---|---|---|
| 0 702 150 | 3/1996 | European Pat. Off. | 290/38 R |
| 50-5807 | 1/1975 | Japan . | |
| 8 93607 | 4/1996 | Japan | 290/38 R |
| 968 157 | 8/1964 | United Kingdom | 290/38 R |

*Primary Examiner*—Elvin G. Enad

*Attorney, Agent, or Firm*—Pillsbury Madison & Sutro LLP

[57] ABSTRACT

A starter has a motor, output shaft driven by the motor, a pinion moving body mounted on the output shaft and engageable with a ring gear, an electromagnet switch, and a rotation restricting member driven by the electromagnet switch to engage and restrict rotation of the pinion moving body until engagement of a pinion gear with the ring gear. To protect the pinion rotation restricting member, continued engagement of the rotation restricting member with the pinion moving body is released by a guide when the pinion moving body rotates a predetermined angle. Further, to protect the pinion moving body, the pinion moving body is advanced closely to the ring gear and thereafter the motor is allowed to rotate so that the pinion engages the ring gear at low rotation speeds.

20 Claims, 18 Drawing Sheets

STARTER HAVING A PINION MOVEMENT CONTROL STRUCTURE

CROSS REFERENCE TO RELATED APPLICATION

This application is based on Japanese Patent Applications No. 8-180243 filed on Jul. 10, 1996, No. 8-207459 filed on Aug. 6, 1996, No. 8-217170 filed on Aug. 19, 1996 and No. 8-286244 filed on Oct. 29, 1996, the contents of which are incorporated herein by reference.

BACKGROUND OF THE INVENTION

1. Field of the Invention

The present invention relates a starter having a pinion movement control structure.

2. Description of Related Art

Small-sized and lightweight starters are proposed in Japanese Patent Application Laid-Open No. 8-93607 and No. 50-5807. The starter has a starting motor, an output shaft driven by the starting motor, a pinion spline-fitted on the output shaft, and a pinion rotation restricting member which restricts the rotation of pinion to advance the pinion axially on the output shaft through the helical spline fitting by a rotation difference relative to the output shaft.

In this type of starter, it often occurs that even when the pinion reaches the end side of the ring gear of an engine, the pinion fails to mesh with the ring gear for one reason or another. This may occur when the starter is restarted while the pinion is still in the course of inertia rotation which exists immediately after starting the starter. At this time, the pinion rotation restricting member is still engaged with the pinion and is pulled toward the pinion rotation direction. Thus, the pinion rotation restricting member is subjected to extreme deformation and may possibly break.

Further, while the pinion is moving on the output shaft toward the ring gear, the starting motor picks up rotation speed rapidly thereby causing a large impact upon meshing of the pinion with the ring gear. Therefore, sufficient rigidity to withstand impact is required for a rotational force transmission part of the starter including the pinion.

SUMMARY OF THE INVENTION

The present invention therefore has a first object of proving a starter which avoids extreme deformation of a pinion rotation restricting member when a pinion fails to mesh with a ring gear.

The present invention has a second object of providing a starter which reduces an impact between a pinion and a ring gear upon meshing.

According to the present invention, for attaining the first object, there is provided a structure by which a pinion rotation restriction member is disengaged from a pinion moving member upon rotation of the pinion moving member by a predetermined angle from an initial engagement position.

According to the present invention, for attaining the second object, there is provided a structure by which a pinion moving body is advanced a predetermined distance toward a ring gear and then a starting motor is turned on, so that the pinion meshes with the ring gear when the rotation speed is still low.

BRIEF DESCRIPTION OF THE DRAWINGS

Other objects, features and advantages of the present invention will become more apparent from the following detailed description which is to be read with reference to the accompanying drawings, in which.

DETAILED DESCRIPTION OF PRESENTLY PREFERRED EMBODIMENTS

Figure 1:
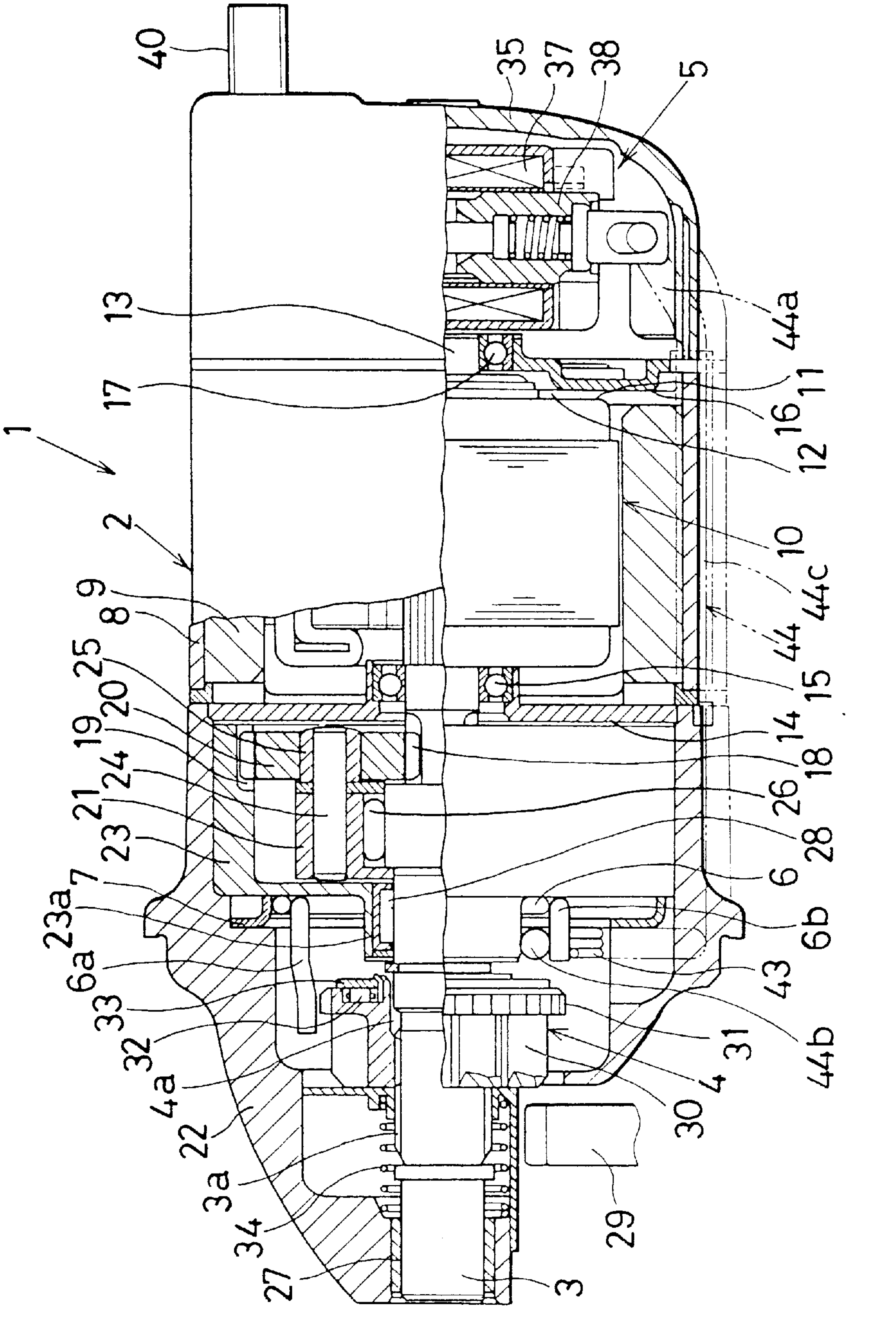
FIG. 1 is a sectional view of a starter according to the first embodiment of the present invention.

The present invention will be described with reference to various embodiments shown in the drawings.

First Embodiment

In this embodiment, as shown in FIG. 1, a starter 1 is made up of a starting motor 2 for generating a rotational force, a planetary reduction gear (described below) for decelerating rotation of the starting motor 2, an output shaft 3 for rotating upon receiving the rotational force of the reduction gear, a pinion moving body 4 fitted onto the output shaft 3, an electromagnet switch 5 for controlling current suplly to the starting motor, a rotation restricting member 6 (FIG. 2) for restricting rotation of the pinion moving body 4 before the starting motor 2 starts rotating, and a plate 7 (FIG. 3) to release restriction on the rotation of the pinion moving body 4 applied by the rotation restricting member 6.

The starting motor 2 is constructed by a cylindrical yoke 8 forming a magnetic frame, a fixed magnetic pole 9 (e.g., a plurality of permanent magnets) secured to an inner periphery of the yoke 8, an armature 10 rotatably disposed inside the inner periphery of the fixed magnetic pole 9, and brushes 12 in sliding contact with a commutator 11 provided at the rear end side of the armature 10 (right end side in FIG. 1).

One end of a rotation shaft of the armature 10 is rotatably supported via a bearing 15 held by a separating plate 14 which separates the armature 10 from the reduction gear while the other end of the rotation shaft 13 is rotatably supported via a bearing 17 held by a partition 16 which separates the armature 10 from the electromagnet switch 5.

The reduction gear is composed of a sun gear 18 (outer teeth) formed around the outer periphery on one end side of the rotation shaft 13, an internal gear 19 (inner teeth) positioned radially outside the sun gear 18, a plurality of planetary gears 20 which are interposed between the sun gear 18 and the internal gear 19 in mesh with both gears 18 and 19, and a carrier 21 rotatably supporting the planetary gears 20 through pins 24.

The internal gear 19 is formed on the internal periphery of a gear forming member 23 subjected to rotational restriction on the internal periphery of a front housing 22. The planetary gears 20 are rotatably supported via respective bearings 25 inserted onto the outer periphery of the pins 24 which are pressed into the carrier 21. The carrier 21 is positioned radially outside the rear end of the output shaft 3. Rollers 26 are placed between the carrier 21 and the rear end of the output shaft 3, forming a one-way clutch with the rear end of the output shaft 3 and the rollers 26. This one-way clutch transmits the rotation output of the reduction gear via the rollers 26 to the output shaft 3.

The output shaft 3 is coaxially arranged with the rotation shaft 13. The output shaft 3 has one end thereof rotatably supported via a bearing 27 which is supported by the front housing 22, and the other end rotatably supported via a bearing 28 which is supported by an inner cylindrical part 23*a* of the gear forming member 23. On the outer periphery between both bearings 27 and 28 of the output shaft 3, there is formed a helical spline 3*a*, onto which a helical spline 4*a* formed in the internal periphery of the pinion moving body 4 is fitted.

The pinion moving body 4 includes a pinion gear 30 to mesh with a ring gear 29 which is provided on the drive shaft of the engine, and a flange 31 on the rear end side of the pinion gear 30 (right end side in FIG. 1) which has a larger outside diameter than that of the pinion gear 30 and which is formed a multiplicity of protrusions and recesses 31*a* (FIG. 2) on the outer periphery thereof; a washer 33 (thrust bearing) which is rotatably supported via rollers 32 is disposed on the rear end side thereof.

The pinion moving body 4, which is axially movably provided through fitting of the helical spline 3*a* of the output shaft 3 with the helical spline 4*a* of the pinion moving body 4, is urged or biased normally toward the rear side of the starter 1 (opposite side of the ring gear 29) by a spring 34 arranged in front of the pinion gear 30.

The electromagnet switch 5 is disposed on the rear end of the starter 1 and fixed to the inner periphery of a bowl-shaped rear casing 35. This electromagnet switch comprises an attraction coil 37 which is turned on with the closing of a key switch 36 (FIG. 5) and a plunger 38 movably provided in the inner periphery of the attraction coil 37. The movement of the plunger 38 is followed by the making and breaking of a motor contact (explained below) interposed in an electric circuit (FIG. 5) of the starting motor 2. It is to be noted that the attraction coil 37 and the plunger 38 are disposed so that the plunger 38 will move in the radial direction of the rear casing 35 (upward and downward directions in FIG. 1).

Figure 5:
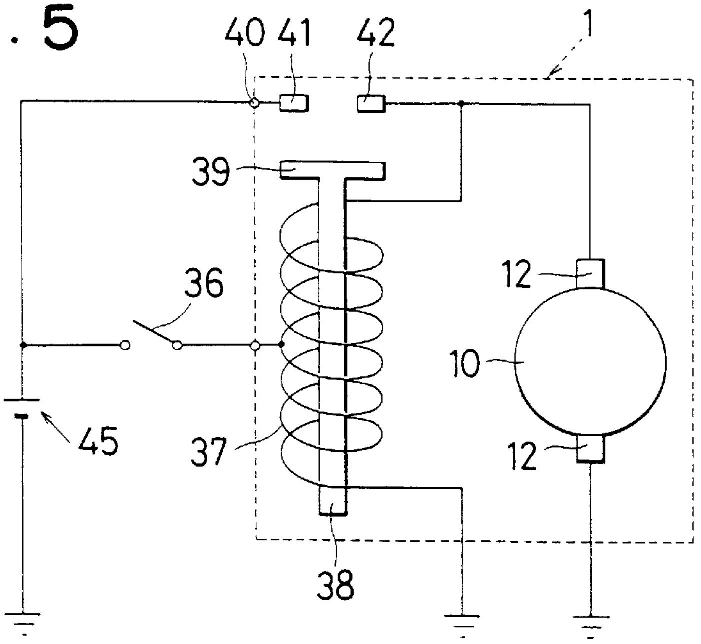
FIG. 5 is an electric circuit diagram of a starter according to the first embodiment.

As shown in FIG. 5, the motor contact is made up of a movable contact 39 attached to the upper end of the plunger 38, a battery-side fixed contact 41 integrally constructed with a battery terminal 40 fixed to the rear casing 35, and a motor-side fixed contact 42 connected to the brush 12 (anode side). When the plunger 38 is attracted and moves upward in FIGS. 1 and 5, the movable contact 39 comes into contact with both fixed contacts 41 and 42, thereby supplying current from a battery 45.

Figure 2:
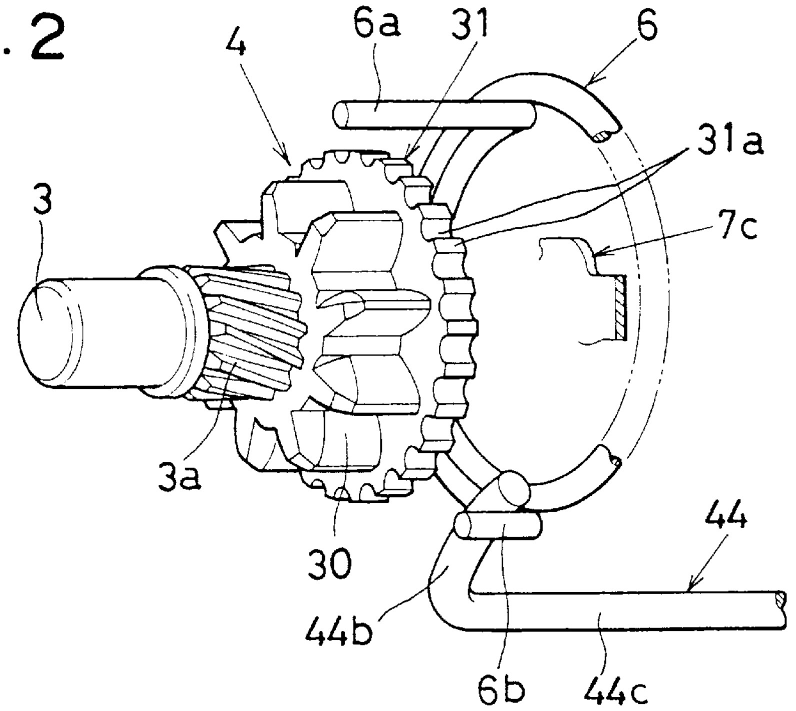
FIG. 2 is a perspective view of a pinion movement control structure according to the first embodiment.

As shown in FIG. 2, the rotation restricting member 6 is formed, for example, by bending a metallic bar member into the shape of a loop with both ends 6*a* and 6*b* at radially mutually facing positions being bent at approximately right angles into the same direction. The rotation restricting member 6 is so arranged that a part bent around in the loop shape is provided radially outside the inner cylinder 23*a* of the gear forming member 23 in a space formed between the plate 7 arranged ahead of the gear forming member 23 and the gear forming member 23 while both ends 6*a* and 6*b* bent in the same direction are taken out through the plate 7, the entire assembly being movable in the upward and downward directions in FIG. 1.

One end 6*a* (upper protrusion 6*a*) is taken out of the radially upper part of the plate 7 (radially outside the outer periphery of the flange 31 of the pinion moving body 4), and the tip thereof is normally positioned ahead of the flange 31. Also, the other end 6*b* (lower protrusion 6*b*) is taken out of the radially lower part of the plate 7, and the tip thereof is normally positioned behind the washer 33 of the pinion moving body 4.

A spring 43 fixed to the plate 7 is in engagement with the lower protrusion 6*b* so that the rotation restricting member 6 is normally biased upward in FIG. 1 due to the biasing of the spring 43. It will be noted that the rotation restricting member 6 can be moved downward in FIG. 1 against the biasing of the spring as the operating force of the electromagnet switch 5 (movement of the plunger 38) is transmitted through a bar 44.

The bar 44 comprises a moving part 44*a* engaging the plunger 38 to follow the movement of the plunger 38, an operating part 44*b* engaging the lower protrusion 6*b* to operate the lower protrusion 6*b*, and a straight coupling part 44*c* connecting the moving part 44*a* to the operating part 44*b*. The bar 4 operates as follows: the coupling part 44*c* extends generally in parallel to the rotation shaft 13 and radially outside the armature 10 and outside the reduction gear, while the coupling part 44*c* is rotatably supported by two bearings (not illustrated) so that as the moving part 44*a* moves following the plunger 38, such movement is converted to rotational movement of the coupling part 44*c*, thus enabling the operating part 44*b* to move the lower protrusion 6*b* downward.

Figure 3:
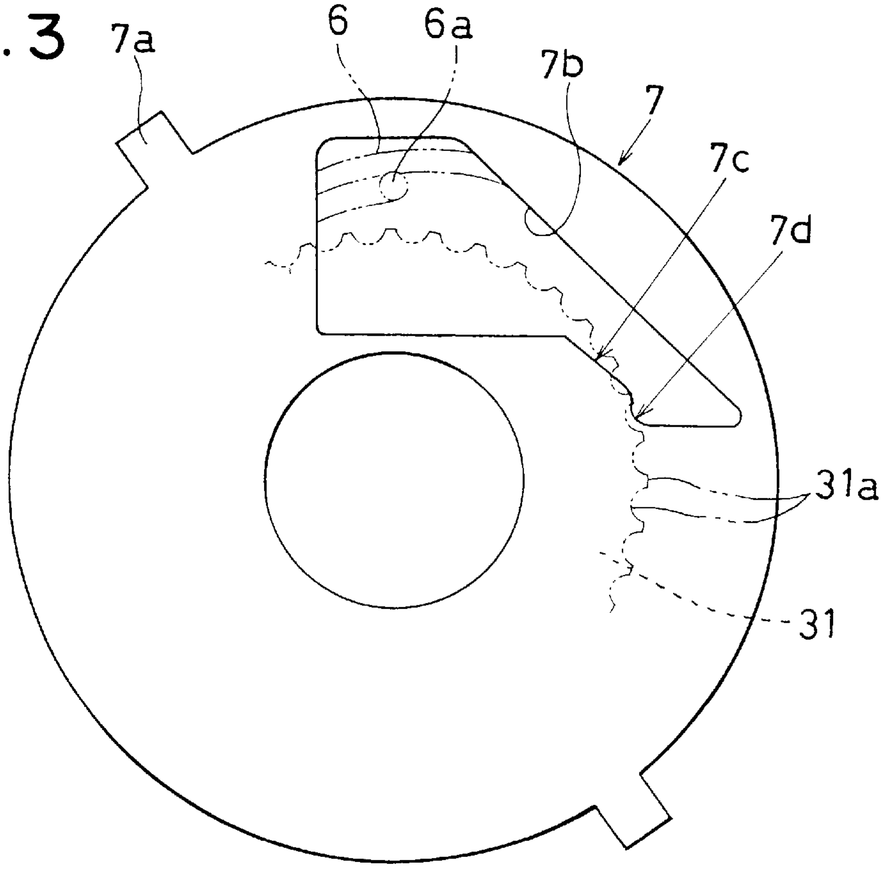
FIG. 3 is a plan view of a plate used in the pinion movement control structure.

As shown in FIG. 3, the plate 7 is provided substantially in a circular form subject to rotational restriction with respect to the front housing 22 by means of projections 7*a* formed at two locations on the outer periphery. This plate 7 has an opening or slot 7*b* through which the upper protrusion 6*a* is taken out and another slot (not illustrated) through which the lower protrusion 6*a* is taken out. The slot 7*b* from which the upper protrusion 6*a* is taken out is formed to extend radially inwardly toward the outer periphery of the pinion moving body 4 so that the upper protrusion 6*a* can move as being pulled down by rotation of the pinion moving body 4 while still being engaged with the protrusions and recesses 31*a* of the flange 31.

Also, an incline (guide surface) 7*c* which, upon rotation of the pinion moving body 4 by the predetermined angle from the position of engagement of the upper protrusion 6*a* with the protrusions and recesses 31*a*, disengages the upper protrusion 6*a* having followed the rotation of the pinion moving body 4 while in engagement with the protrusions and recesses 31*a* thereof from the protrusions and recesses 31*a*, as well as a holding part 7*d* to hold the disengaged upper protrusion 6*a* are formed in this slot 7*b*.

Next, operation of this embodiment will be explained.

Figure 4A:
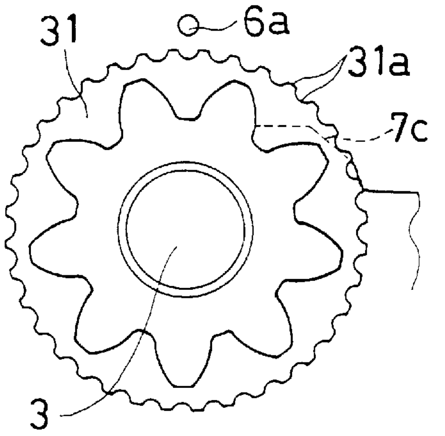
FIGS. 4A–4F are explanatory views illustrating operation process of the pinion movement control structure.
Figure 4B:
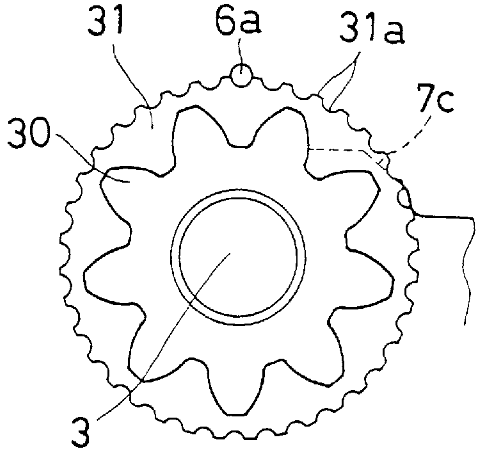
Figure 4C:
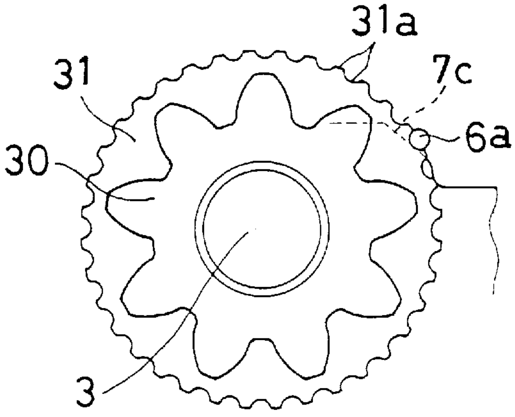
Figure 4D:
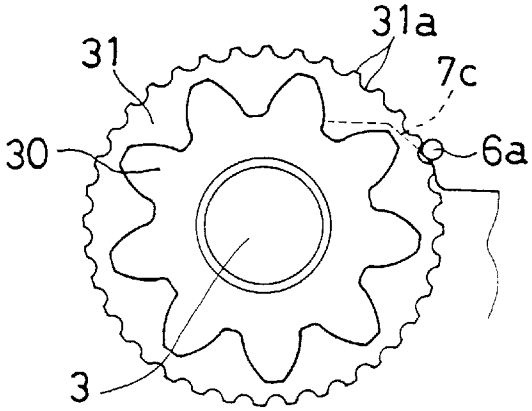
Figure 4E:
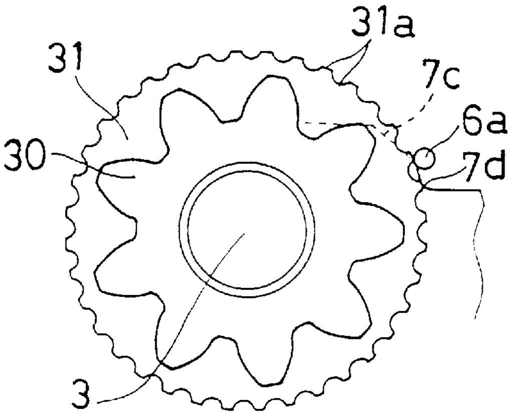

Upon closing a key switch 36 (FIG. 5), electric current flows from the battery 45 to the attraction coil 37 of the electromagnet switch 5 to generate a magnetic force, which attracts and moves the plunger 38 upward in FIG. 1. Such movement is transmitted through the bar 44 to the rotation restricting member 6, thereby causing the rotation restriction member 6 to move downward in FIG. 1 while flexing the spring 43 (FIG. 4A). This enables the upper protrusion 6*a* of the rotation restricting member 6 to engage the protrusions and recesses 31*a* provided on the outer periphery of the flange 31 of the pinion moving body 4 (FIG. 4B), thus restricting the rotation of the pinion moving body 4 before rotation of the starting motor 2.

On the other hand, in the electromagnet switch 5, current flows from the battery 45 to the armature 10 as movement of the plunger 38 makes the movable contact 39 abut both fixed contacts 41 and 42, and the armature 10 starts rotating. Rotation of the armature 10 is first reduced by the reduction gear, then transmitted to the output shaft 3 to cause the output shaft 3 to rotate. This rotation tends to rotate the pinion moving body 4. However, inasmuch as the pinion moving body 4 is subjected to rotation restriction by the rotation restricting member 6, the rotation of the output shaft 3 acts upon the pinion moving body 4 as propulsion due to the fitting of helical splines 3*a* and 4*a*. This results in causing the pinion moving body 4 to move axially on the output shaft 3 to let the front end side of the pinion gear 30 of the pinion moving body 4 to come into contact with the rear end side of the ring gear 29. At this instant, the upper protrusion 6*a* in engagement with the protrusions and recesses 31*a* of the flange 31 can flex in the rotational direction of the pinion moving body 4, making it possible for the pinion gear 30 to mesh with the ring gear 29 during rotation of the pinion gear 30 at least by one pitch and, again, resulting in causing the pinion moving body 4 to move axially further on the output shaft 3 to let the pinion gear 30 completely mesh with the ring gear 29. Upon completing meshing of the pinion gear 30 with the ring gear 39, the upper protrusion 6*a* which is in engagement with the protrusions and recesses 31*a* disengages therefrom and falls behind the washer 33 provided at the rear end side of the pinion moving body 4 to prevent the pinion moving body 4 from retreating.

Figure 4F:
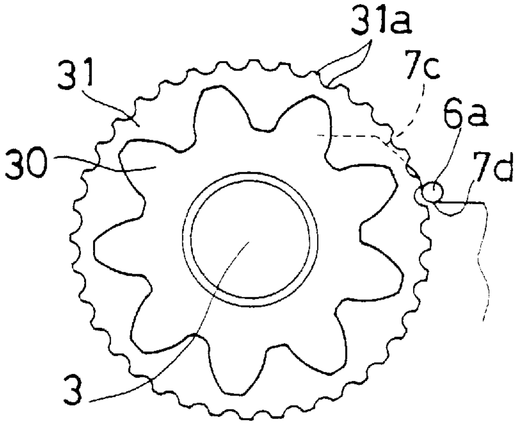

For one reason or another, the pinion gear 30 may fail to mesh with the ring gear 29. This may happen, for example, when the starting motor 2 is restarted immediately after interruption of current supply to the starting motor 2 because of misfire in the engine. At this moment, the pinion moving body 4 is still in inertia rotation. Therefore, the meshing of the pinion moving body 4 (the pinion gear 30) with the ring gear 29 is normally incapacitated. In this case, because the end side of the pinion gear 30 is in contact with the end side of the ring gear 29, the pinion moving body 4 cannot advance and tends to rotate with the output shaft. As a result, the upper protrusion 6*a* engaging the protrusions and recesses 31*a* is pulled by the rotation of the pinion moving body 4, radially flexing and gradually moving in the middle of the rotation, as shown in FIG. 4, to radially outside the pinion moving body 4 along the incline 7*c* formed in the slot 7*b* of the plate 7 (FIG. 4C and 4D), upon rotation of the pinion moving body 4 by the predetermined angle, disengaging from the protrusions and recesses 31*a* (FIG. 4E), and being held by the holding part 7*d* which follows the incline 7*c* (FIG. 4F).

Although a returning force is produced when the upper protrusion 6*a* which has disengaged from the protrusions and recesses 31*a* is pulled to the rotational direction and undergoes elastic deformation, the upper protrusion 6*a*, once held by the holding part 7*d* of the plate 7, will not disengage therefrom to engage the protrusions and recesses 31*a* again, because, while the starter 1 is starting, attraction of the electromagnet switch 5 (force to attract the plunger 38) urges the rotation restricting member 6 downward in FIG. 1 via the bar 44. However, if the force to urge the rotation restricting member 6 downward is weak against the returning force, the upper protrusion 6*a* may possibly disengage from the holding part 7*d* and engage the protrusions and recesses 31*a* again. Hence, a biasing force sufficient to keep the upper protrusion 6*a* in the holding part 7*d* must be applied to the rotation restricting member 6.

After the upper protrusion 6*a* is held in the holding part 7*d* of the plate 7, the key switch 36 is turned off to stop current supply to the attraction coil 37. The plunger attraction force of the electromagnet switch 5 disappears so that a load biasing the rotation restricting member 6 downward in FIG. 1 via the bar 44 no longer exists. As a result, a reaction of the spring 43 pushes back the rotation restricting member 6 upward in FIG. 1, the upper protrusion 6*a* leaving the holding part 7*d* of the plate 7 and returning to the stationary position (the position shown in FIG. 1) at which it is held prior to the start of the starter 1.

According to this embodiment, even when the pinion moving body 4 rotates while the meshing of the pinion gear 30 with the ring gear 29 is in the state of incapacity, the upper protrusion 6*a* engaging the protrusions and recesses 31*a* of the flange 31 gradually moves radially in the course of the rotation to the radial outside of the pinion moving body 4 along the incline 7*c* set up on the slot 7*b* of the plate 7, and, upon rotation of the pinion moving body 4 by the predetermined angle, can disengage from the protrusions and recesses 31*a*. Since this makes it possible to avoid repetitions of engagement and disengagement between the upper protrusion 6*a* and the protrusions and recesses 31*a*, which occur when the upper protrusion 6*a* while being engaged with the protrusions and recesses 31*a* is pulled by the rotation of the pinion moving body 4, extreme deformation of the upper protrusion 6*a* and damage to the protrusions and recesses 31*a* can be prevented.

It will also be appreciated that avoiding repetitions of engagement and disengagement therebetween will eliminate noise due to such repetitions. Additionally, since generation of friction heat due to repetitions of engagement and disengagement therebetween is eliminated, the flowing of oil out of the thrust bearing 33 mounted on the pinion moving body 4 can be avoided, thus preventing the thrust bearing life from degrading.

Second Embodiment

Figure 6:
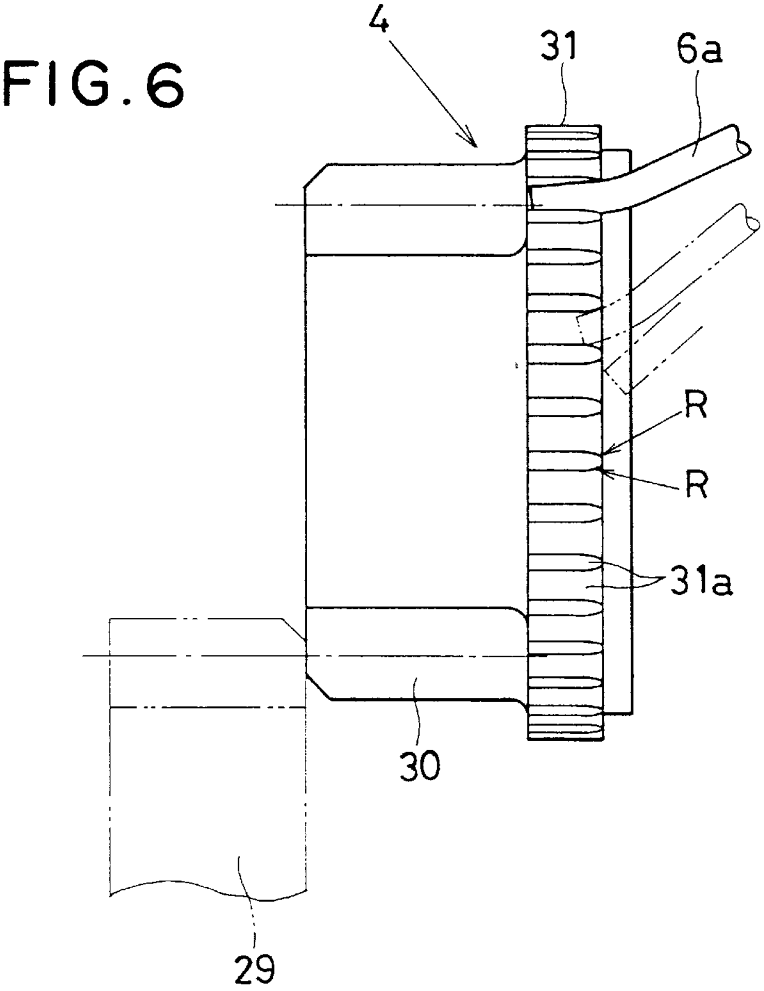
FIG. 6 is a side view showing a pinion movement control structure according to the second embodiment of the present invention.
Figure 7:
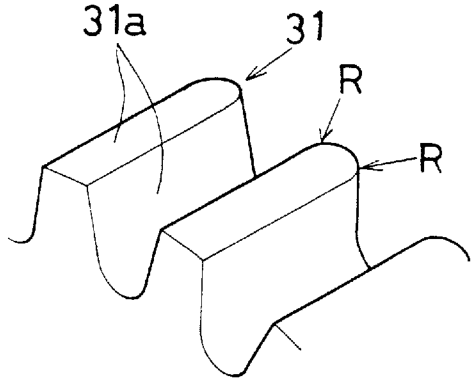
FIG. 7 is a perspective view showing the shape of protrusions and recesses of a pinion moving body used in the second embodiment.

In this embodiment shown in FIGS. 6 and 7, the upper protrusion 6*a* is made easy to pull out of the protrusions and recesses 31*a* when the pinion moving body 4 rotates the predetermined angle. A rounded chamfer R is formed on the corners of the rear engaging sides of the protrusions and recesses 31*a* to make it easy for the tip of the upper protrusion 6*a* to pull out of the protrusions and recesses 31*a* toward the rotational direction of the pinion moving body 4.

Figure 8:
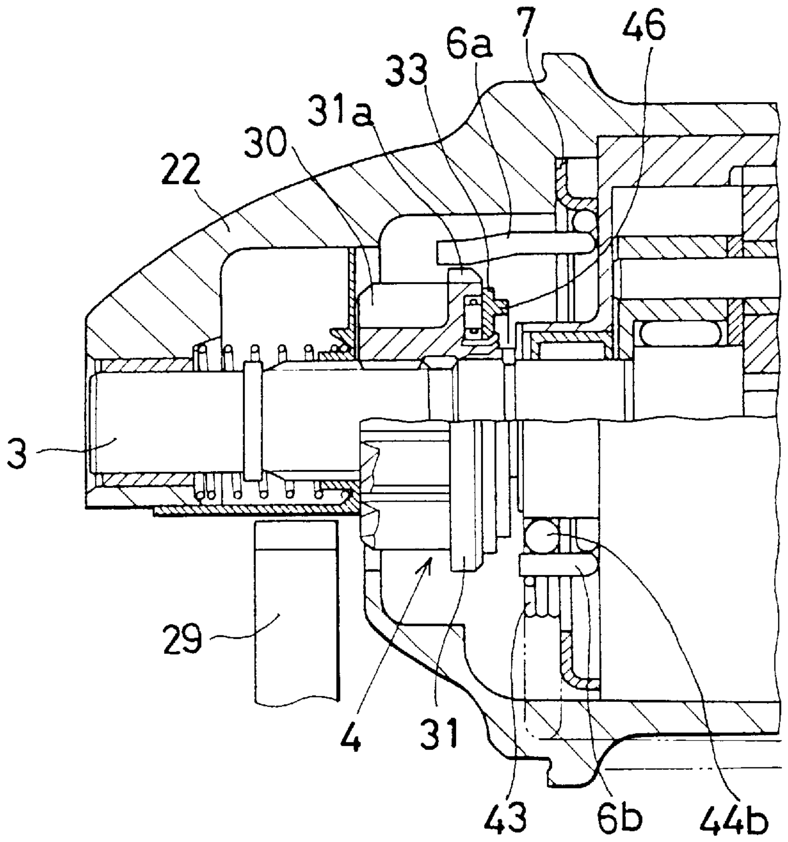
FIG. 8 is a sectional view showing the non-operating state of the pinion movement control structure according to the second embodiment.
Figure 9:
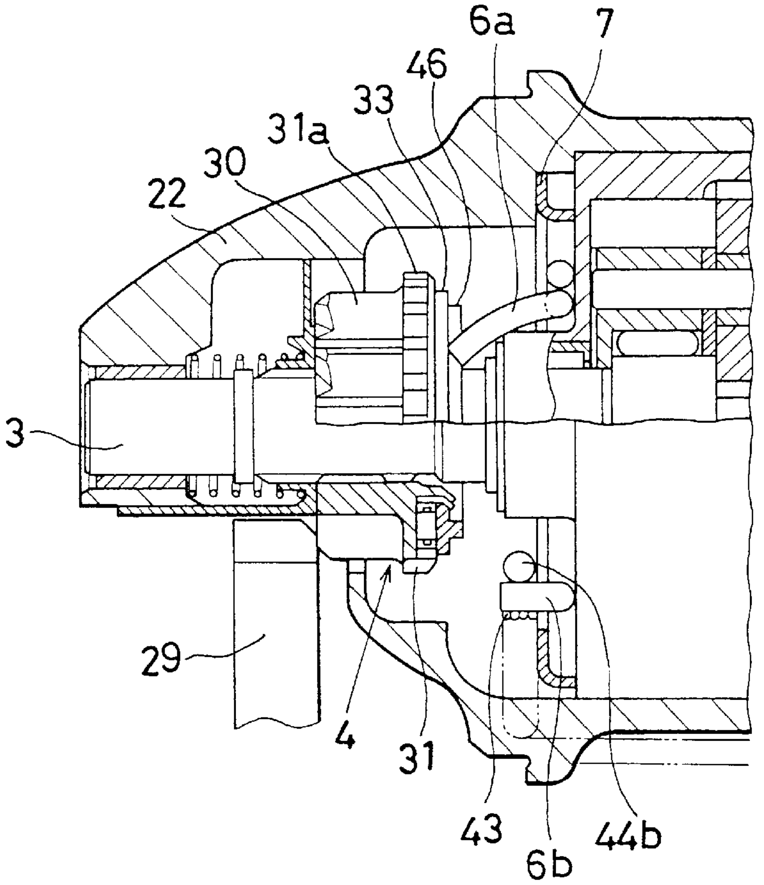
FIG. 9 is a sectional view showing the operating state of the pinion movement control structure according to the second embodiment.

Also, as shown in FIG. 8 and FIG. 9, a cylindrical projection 46 which holds the tip of the upper protrusion 6*a* which has disengaged from the protrusions and recesses 31*a* is provided on the rear end side of the washer 33.

According to this embodiment, when the pinion moving body 4 rotates while the pinion gear 30 and the ring gear 29 are incapable of meshing with each other, the upper protrusion 6 engaging the protrusions and recesses 31*a* undergoes elastic deformation due to rotation of the pinion moving body 4 so that the length of engagement with the protrusions and recesses 31*a* gradually becomes short. Upon rotation of the pinion moving body 4 from the position of the upper protrusion 6*a* in engagement with the protrusions and recesses 31*a* to another position by the predetermined angle, because the corners of the engagement sides of the protrusions and 31*a* are chamfered, the upper protrusion 6*a* can easily disengage therefrom (FIG. 6). The upper protrusion 6*a* after having disengaged from the protrusions and recesses 31*a* has the tip thereof held by the projection 46 set up at the rear end side of the washer 33 as shown in FIG. 9, thereby preventing a fall radially into the inner side (downward in FIG. 9). Although there is no illustration, even if the corners of the engagement sides of the protrusions and recesses 31*a* should be in a C-chamfering shape, the same advantage will be provided.

In this embodiment, too, upon rotation of the pinion moving body 4 from the position of the upper protrusion 6*a* engaged with the protrusions and recesses 31*a* to another position by the predetermined angle, the upper protrusion 6*a* can disengage from the protrusions and recesses 31*a*, hence the same advantages as the first embodiment can be obtained.

Third Embodiment

Figure 10:
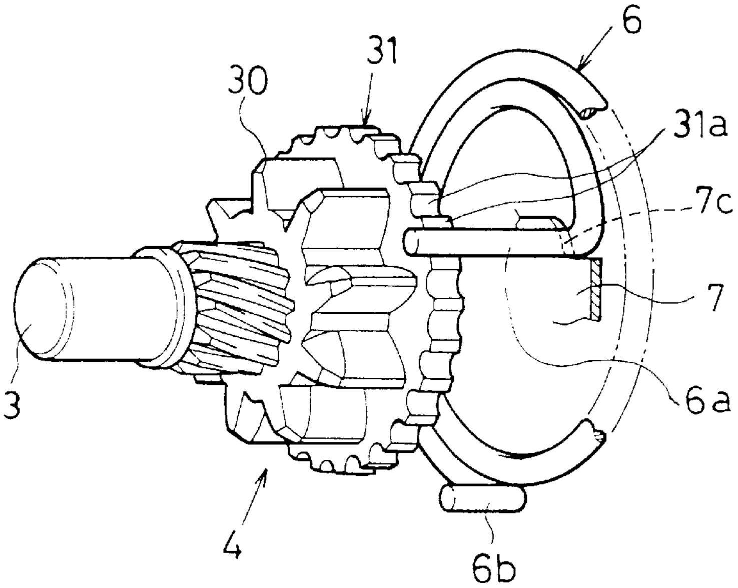
FIG. 10 is a perspective view showing the operation of the pinion movement control structure in the first and the second embodiments.
Figure 11:
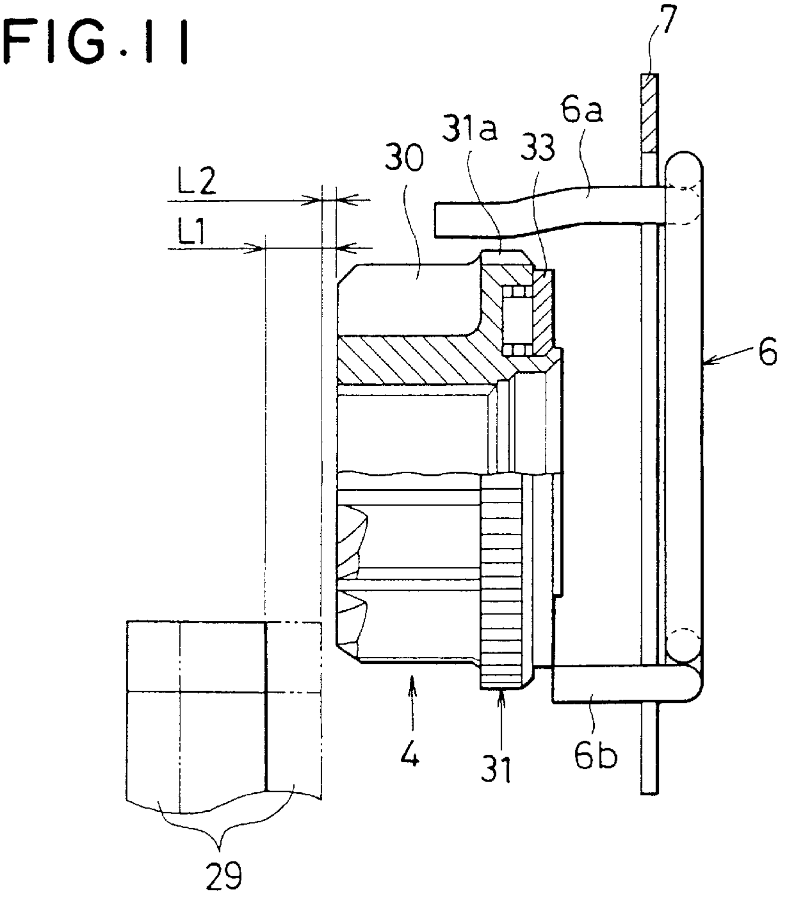
FIG. 11 is a side view showing variations of the spacing between the pinion moving body and the ring gear in the first and the second embodiments.
Figure 12:
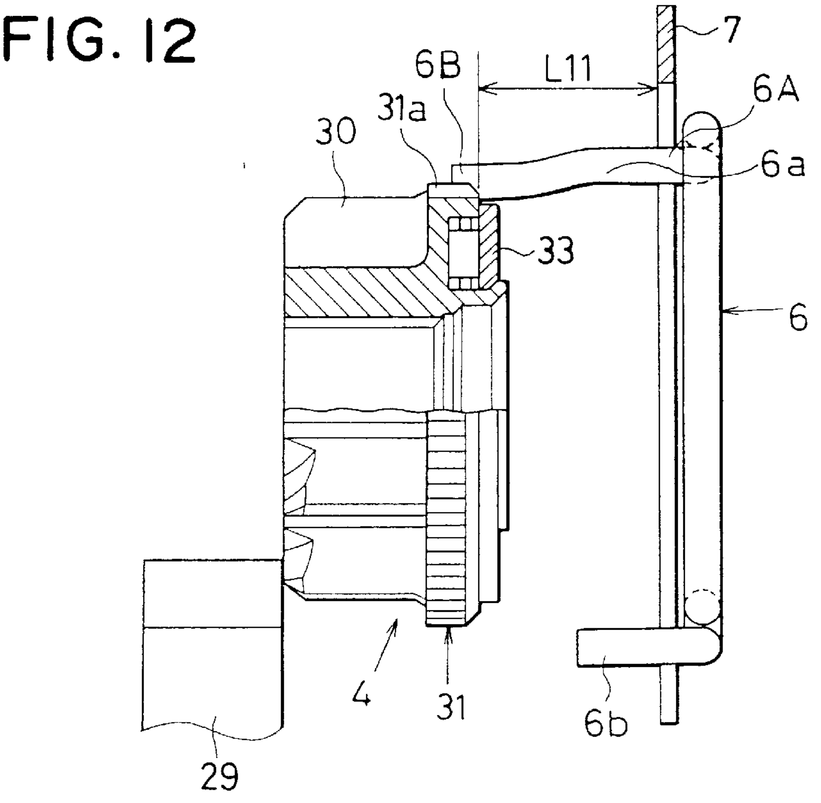
FIG. 12 is a side view showing variations of the spacing between the pinion moving body and the plate in the first and the second embodiments.
Figure 13:
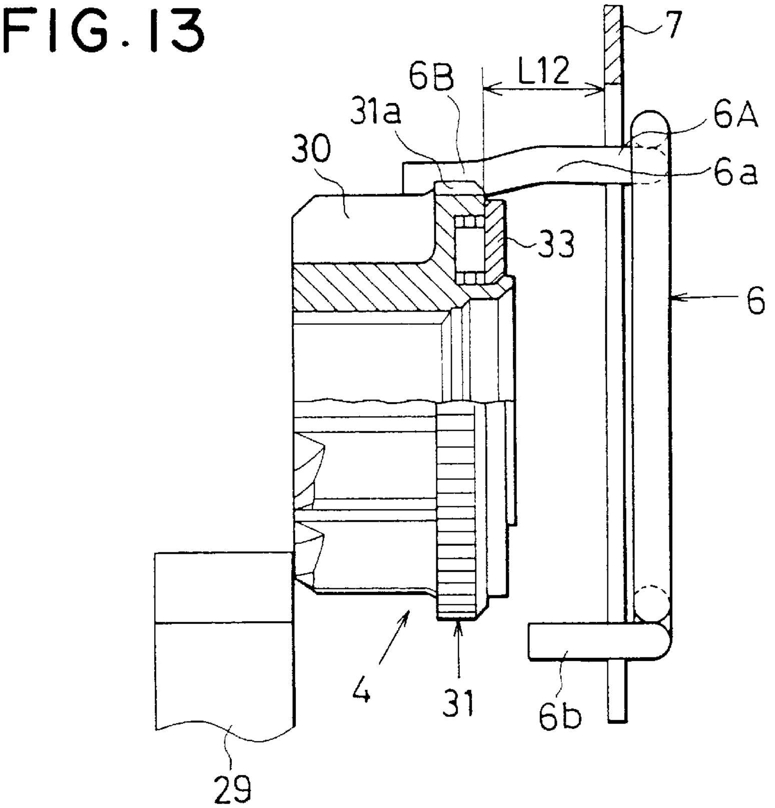
FIG. 13 is a side view showing variations of the spacing between the pinion moving body and the plate in the first and the second embodiments.

In the foregoing first and the second embodiments, the upper protrusion 6*a* of the rotation restricting member 6 rotates in engagement with the protrusions and recesses 31*a* of the flange 31 and comes in contact with the incline 7*c* of the plate 7 as shown in FIG. 10. Because the axial spacing between the ring gear 29 and the pinion moving body 4 varies from L1 to L2 from starter to starter (FIG. 11), the axial spacing or length in the axial direction from the engaging part 6A with the incline 7*c* to the engaging part 6B with the protrusions and recesses 31*a* of the flange 31 will vary from L11 to L12 (FIG. 12 and FIG. 13). At the engaging part 6A with the incline 7*c* of the upper protrusion 6*a*, a bending stress due to rotational force from the pinion moving body 4 occurs, but because such bending stress is prepartal to the foregoing lengths from L11 to L12 in the axial direction, when a variation of lengths in the axial direction occurs, there will also be a variation of bending stress. As a result, there is a need to design the strength of the rotation restricting member 6 by taking into account the maximum stress of variation.

Figure 14:
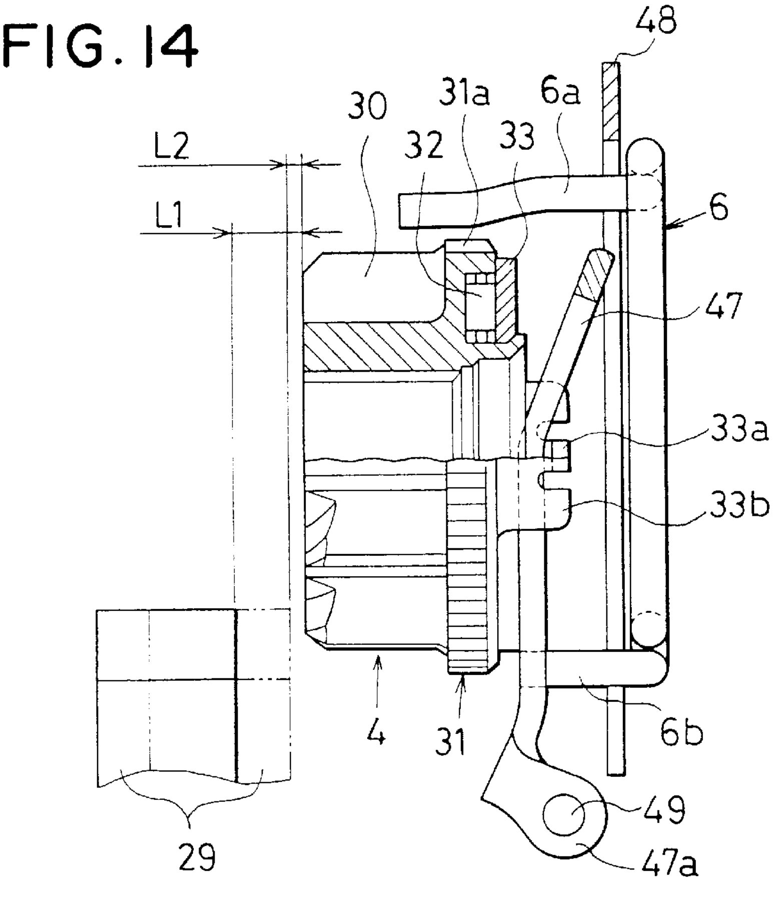
FIG. 14 is a side view showing a pinion movement control structure according to the third embodiment of the present invention.

Accordingly, in the third embodiment, a pinion retreat restricting member 47 is additionally provided as shown in FIG. 14 so that it moves with the pinion moving body 4 to reduce the bending stress which exerts on the upper protrusion 6*a*.

Figure 15:
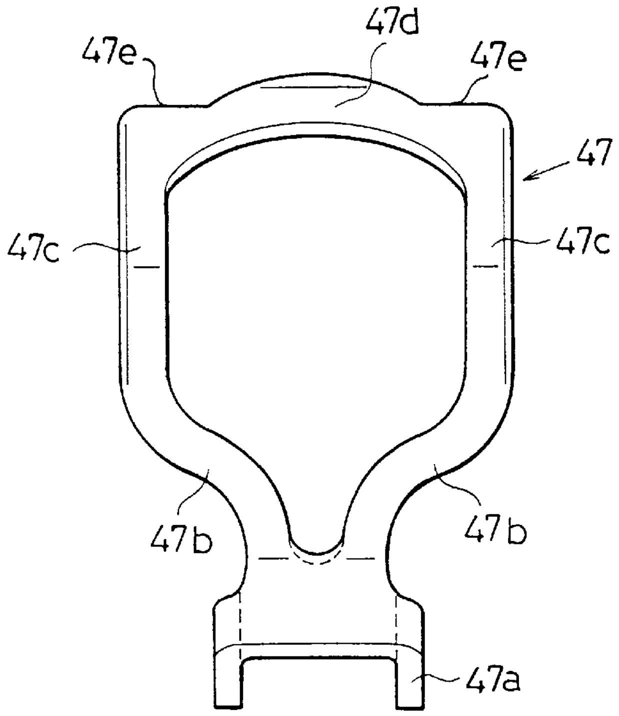
FIG. 15 is a plan view of a pinion retreat restricting member used in the third embodiment.
Figure 16A:
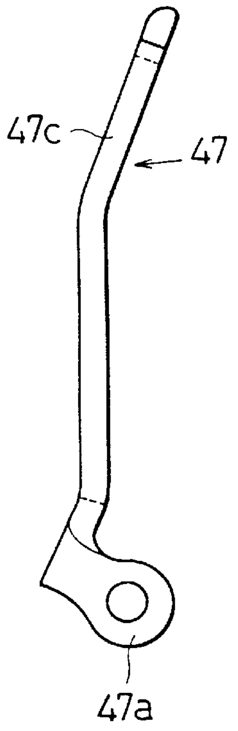
FIGS. 16A and 16B are a side view and a bottom view of the pinion retreat restricting member shown in FIG. 15.
Figure 16B:
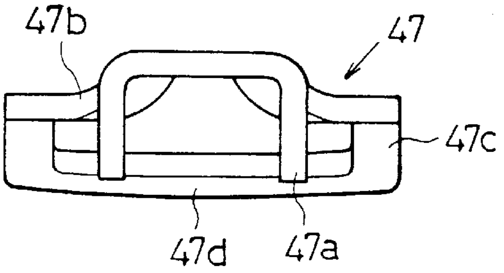
Figure 17:
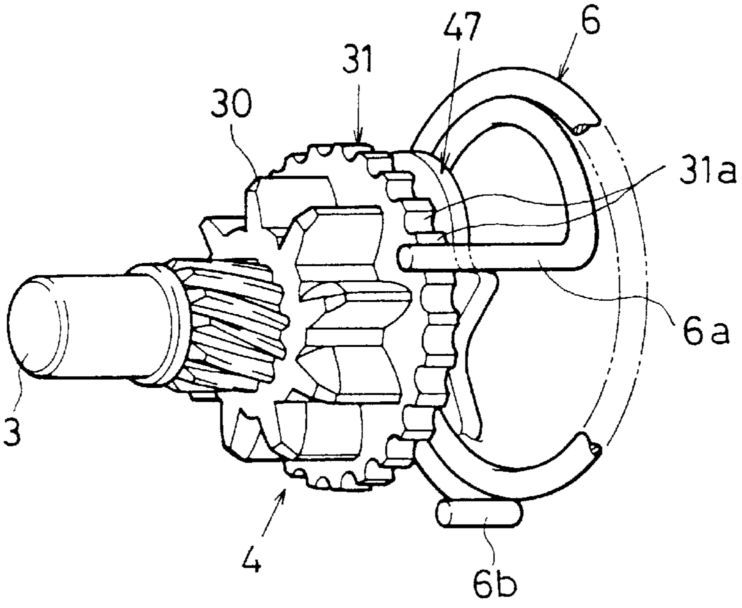
FIG. 17 is a perspective view showing a state of the upper protrusion in contact with a protuberant surface in the third embodiment.

As shown in FIGS. 15, 16A and 16B, the pinion retreat restricting member 47 comprises a fulcrum 47*a* serving as a rotational fulcrum and an annular part formed integrally with the fulcrum 47*a*.

The fulcrum 47*a* is pivotally supported by a pin 49 fixed to the plate 48. The annular part is made up of a forked part 47*b* which forks and extends from the fulcrum 47*a*, a pair of side parts 47*c* extending upward from the forked part 47*b*, and a connecting part 47*d* which links the pair of the side parts 47*c*. On both shoulders of the connecting part 47*d* is formed a protuberant surface 47*e* as engagement part disengaging means. It is to be noted that when viewed from side as shown in FIG. 16A, each of the side parts 47*c* is formed approximately in the shape of "<", a bent part of which is engaged with engagement protrusions 33*a* provided on the washer 33 (thrust bearing) of the pinion moving body 4. The engagement protrusions 33*a* are set up on a pair of protrusions 33*b* which are protrudingly provided from both left and right ends of the washer 33 rearwardly (opposite side of the ring gear 29), each protruding radially to inside the core of the pinion moving body 4.

When the pinion moving body 4 subjected to rotational restriction by engagement with the rotation restricting member 6 (upper protrusion 6*a*) advances on the output shaft 3, the side parts 47*c* is axially pulled while being engaged with the engagement protrusions 33*a* of the washer 33, so that the entire pinion retreat restricting member 47 rotates relative to the pin 49. Thereafter, when the pinion gear 30 of the pinion moving body 4 meshes with the ring gear 29 advancing the predetermined distance, the upper protrusion 6*a* of the rotation restricting member 6 disengages from the protrusions and recesses 31*a* formed on the flange 31 of the pinion moving body 4 and falls behind the pinion moving body 4, thereby releasing the rotation restriction on the pinion moving body 4. Further, the tip of the upper protrusion 6*a* comes into contact with the rear end side of the connecting part 47*d* of the pinion retreat restricting member 47, thereby restricting the retreat of the pinion moving body 4.

Figure 18:
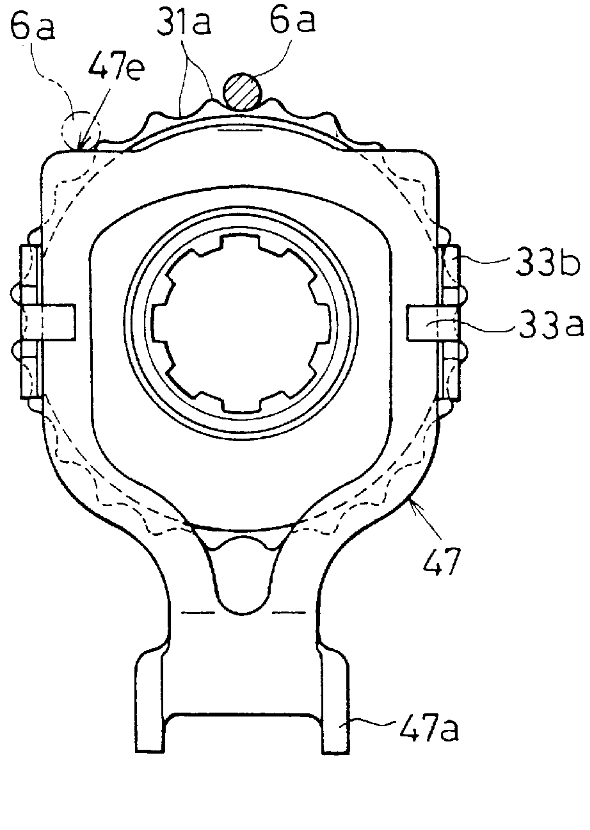
FIG. 18 is a plan view showing a movement of the upper protrusion in the third embodiment.

On the other hand, in the event that the pinion moving body 4 rotation of which has been restricted advances on the output shaft 3 but the pinion gear 30 cannot mesh with the ring gear 29, the upper protrusion 6*a* of the rotation restricting member 6 while being engaged with the protrusions and recesses 31*a* of the flange 31 is pulled by the rotation of the pinion moving body 4 and rotates (flexes). Upon rotation of the pinion moving body 4 by the predetermined angle, the upper protrusion 6*a* comes into contact with the protuberant surface 47*e* provided on the pinion retreat restricting member 47 (FIG. 16), and can disengage from the protrusions and recesses 31*a* by further gradually moving radially outside the pinion moving body 4 along the protuberant surface 47*e* (FIG. 18).

Figure 19:
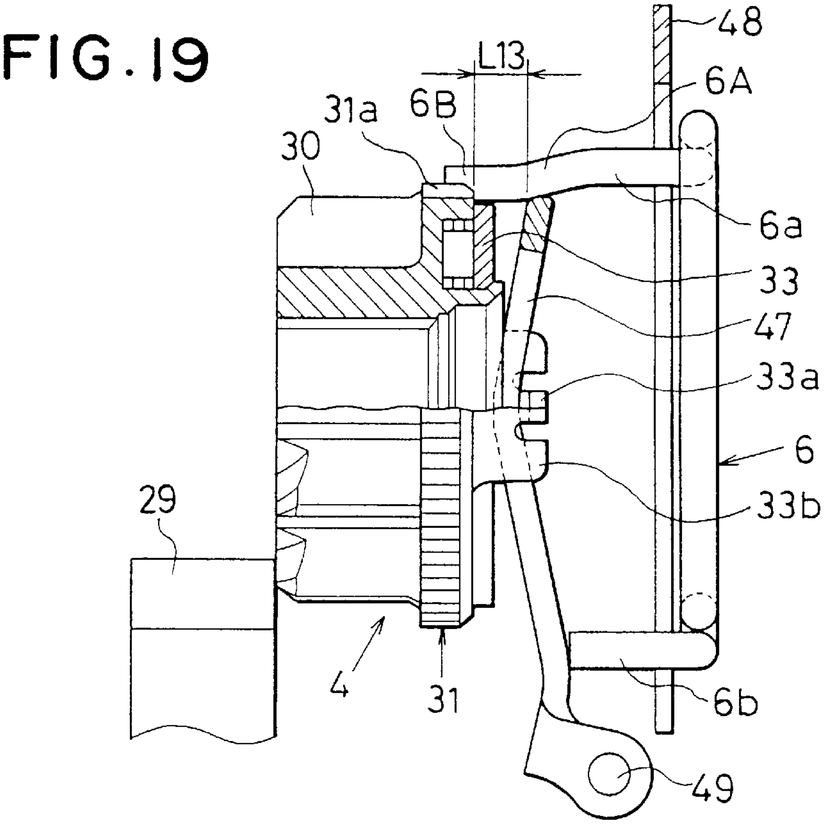
FIG. 19 is a side view showing variations of spacing between the pinion moving body and pinion retreat restricting member in the third embodiment.
Figure 20:
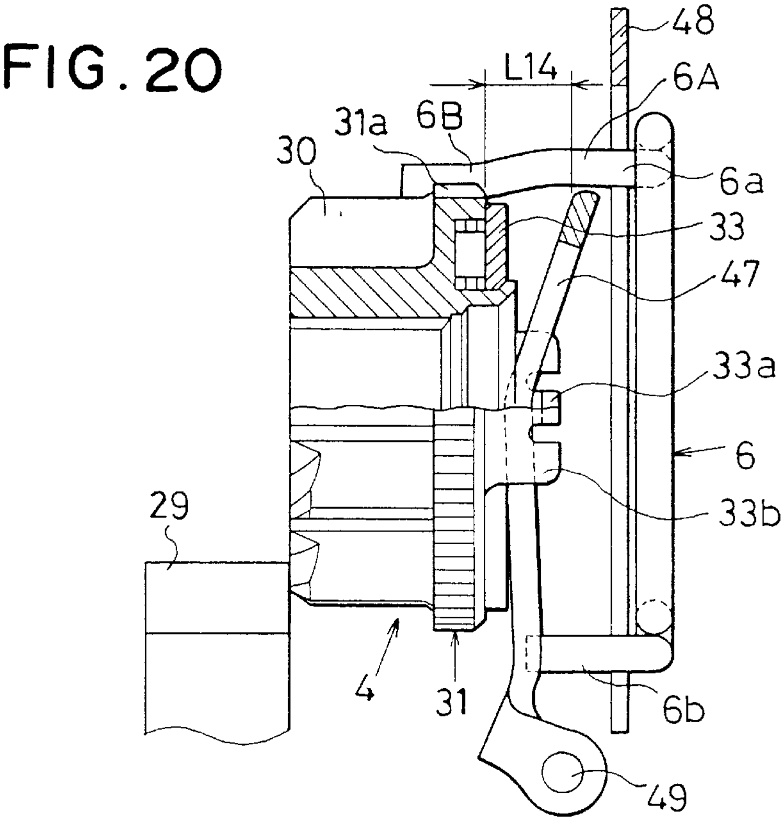
FIG. 20 is a side view showing variations of spacing between the pinion moving body and the pinion retreat restricting member in the third embodiment.

It is to be noted that when the upper protrusion 6*a* has come into contact with the protuberant surface 47*e*, bending stress upon the contact part with the protuberant surface 47*e* is prepartal to the length in the axial direction from the engaged part of the upper protrusion 6*a* with the protrusions and recesses 31*a* to the contact part. However, as shown in FIG. 14, since there exists variations of the axial spacing from L1 to L2 between the pinion moving body 4 and the ring gear 29, a variation from L13 to L14 occurs likewise in the length in the axial direction from the engaged part of the upper protrusion 6*a* with the protrusions and recesses 31*a* to the contact part (FIG. 19 and FIG. 20). It is to be noted, however, that since the pinion retreat restricting member 47 having engagement part disengaging means (protuberant surface 47*e*) can move with the pinion moving body 4 in this third embodiment, the axial spacing L13 and L14 become shorter than the axial lengths L11 and L12 in the first and the second embodiments and the variations thereof from L13 to L14 become smaller than the variations from L11 to L12 of the first and the second embodiments. As a result, as compared with the first and the second embodiments, the bending stress upon the upper protrusion 6*a* can be reduced.

Fourth Embodiment

Figure 22:
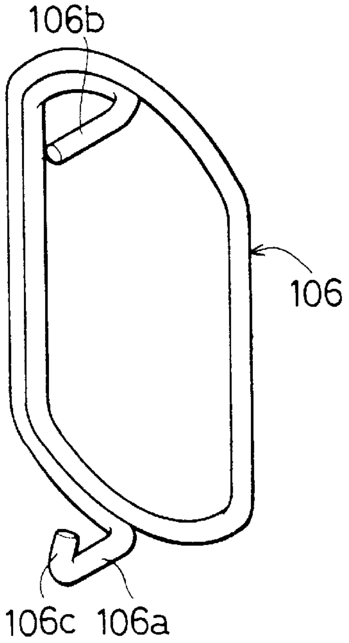
FIG. 22 is a perspective view of a pinion rotation restricting member used in the fourth embodiment.

A starter 1 according to this embodiment comprises a starting motor 102 for generating rotational force, a planetary reduction gear (reduction gear) to reduce rotation of the starting motor 102, an output shaft 103 rotating upon being subjected to rotational output of the reduction gear, a pinion moving body 104 fitted onto the output shaft 103, an electromagnet switch 105 for controlling the supply of electric current to the starting motor 102, and a coil-shaped elastic member 106 (FIG. 22) and the like. The starter 100 is covered with outer housings having an external form of a substantially cylindrical shape. The outer housings are made up of a front housing 107, center casing 108, a yoke 109, a brush holder 110, and a rear casing 111, all of which are secured in the axial direction by tightening up a plurality of through bolts.

The starting motor 102 is constructed so that a fixed magnetic pole 112 (for example, a plurality of permanent magnets) is secured to the inner periphery of the yoke 109 serving as a magnetic frame as well as a part of the outer housing. An armature 113 is rotatably disposed within the inner periphery of the fixed magnetic pole 112, and brushes 115 is placed over a commutator 114 provided at the axial end of the armature 113.

The yoke 109 in a cylindrical shape has one end side which is set inside an open end of the center casing 108 in a spigot-joint manner, while the other end side thereof is set inside an open end of the brush holder 110 in a spigot-joint manner.

The armature 113 has a rotation shaft 116 one end of which is inserted into a recess 103*a* formed at the rear end of the output shaft 103 and is rotatably supported via a bearing 117 fitted into the inner periphery of the recess 103*a*.

The commutator 114 is formed of a plurality of commutator bars combined into a cylindrical shape on the outer periphery of the other end side of the rotation shaft 116. The brush 15 is disposed in a brush casing 120 formed of the brush holder 110 and a plate 119 and biased by a spring 121 to the outer periphery of the commutator 114. However, the brush 115 is subject to movement restriction in the rotational direction with the brush casing 120 being radially (upward and downward directions in FIG. 21) slidably.

The reduction gear comprises a sun gear 122 (outer teeth) formed on the outer periphery of one end side of the rotation shaft 116, an internal gear 123 (inner teeth) radially located on the outer periphery of the sun gear 122, and a plurality of planetary gears 124 placed between the sun gear 122 and the internal gear 123 and in mesh with both gears 122 and 123.

The internal gear 123 is formed on the inner periphery side of a gear forming member 125 disposed in the inner periphery of the center casing 108. The gear forming member 125 which makes up, together with an inner cylindrical part 108*a* and rollers 126, a one-way clutch via the rollers 26 between the gear forming member 125 and the inner cylindrical part 108*a* of the center casing 108, is unrotatably provided in the rotational direction of the armature 113 and rotatably set up against the rotational direction thereof with respect to the center casing 108 through operation of the one-way clutch.

The planetary gear 124 is rotatably supported via a bearing 128 fitted onto the outer periphery of a pin 127 which is pressed into a large-diameter part 103A set up on the outer periphery of the rear end of the output shaft 103.

The output shaft 3 is coaxially provided with the rotation shaft 116, one end thereof being rotatably supported via a bearing 129 held in the front casing 107 and the other end side being rotatably supported via a bearing 130 held in the inner cylindrical part 108*a* of the center casing 108, while the axial movement thereof relative to the center casing 108 is restricted. On the outer periphery side of the output shaft 103 projecting forward (left direction in FIG. 21) of the center casing 108 is formed a helical spline 103*b* onto which a helical spline 104*a* formed on the inner periphery of the pinion moving body 104 is fitted.

The pinion moving body 104 is integrally formed a pinion gear 132 for meshing with a ring gear 31 set up on a drive shaft of an engine, and a flange 133 having an outer diameter larger than that of the pinion gear 132 as well as a multiplicity of protrusions and recesses 133*a* on the outer periphery thereof is integrally formed on the rear end side (right end side in FIG. 21) of the pinion gear 132. Also, on the rear end side of the pinion moving body 104 is disposed a washer 135 which is rotatably supported via rollers 134.

The pinion moving body 104 is normally biased toward the ring gear 131 by means of a spring 136 interposed between the washer 135 and the center casing 108.

The electromagnet switch 105 is housed in the rear casing 111 in the rear of the brush holder 110. The electromagnet switch 5 is made up of an attraction coil 137 for generating magnetic force upon receiving electric current, a plunger 138 movably provided in the inner periphery of the attraction coil 137, an external terminal (explained below) providing connection to outside wiring, and a motor contact (explained below) interposed in a circuit for supplying current to the armature 113, and the like. The electromagnet switch 105 is disposed so that the moving directions of the plunger 38 lies in the radial direction of the starter 1 (upward and downward directions in FIG. 21).

The external terminal is a switch terminal (not illustrated herein) which is connected to wiring from a battery terminal 139 to which a battery cable is connected to a battery through a key switch. The motor contact comprises a movable contact 142 which is attached via an insulation member 141 to the end of a rod 140 interlocked to the plunger 138, a battery-side fixed contact 143 which is integrally formed with the battery terminal 139, and a motor-side fixed contact (not illustrated) which is connected to the brush 115. Both fixed contacts 143 are turned on as the movable contact 142 abuts both fixed contacts 143 with the movement of the plunger 138.

The coil-shaped elastic member 106 is, as shown in FIG. 2, formed, for example, by winding a metallic rod around in a coil shape, both ends thereof 6*a* and 6*b* bent approximately orthogonally to the same direction.

Figure 23:
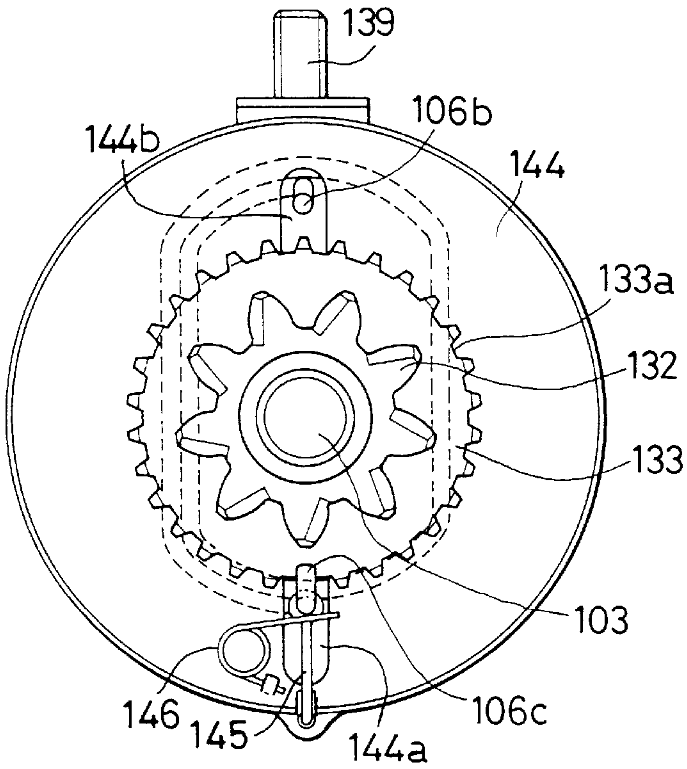
FIG. 23 is a plan view of a pinion moving body as viewed from the front side in the fourth embodiment.

The pinion rotation restricting member 106 is placed so that a part thereof wound around in the coil shape is provided movably in the upward and downward directions in a space formed between the center casing 108 and a plate 144 placed fixedly on the front side thereof. Both ends 106*a* and 106*b* of the member 106 are bent at right angles passing through slots 144*a* and 144*b* (FIG. 23) formed in the plate 144 to be picked up on the forward side of the plate 144.

However, one end (lower protrusion) 106*a* is located radially at the lower side of the pinion moving body 104 and a tip 106*c* is formed in a hook shape (hook 6*c*) for engaging the front end side of the flange 133 and normally restricting forward movement of the pinion moving body 104 biased forward by the spring 136. The other end (upper protrusion) 106*b* is radially positioned on the upper side of the pinion moving body 104 a predetermined distance away from the outer periphery of the flange 133.

Figure 21:
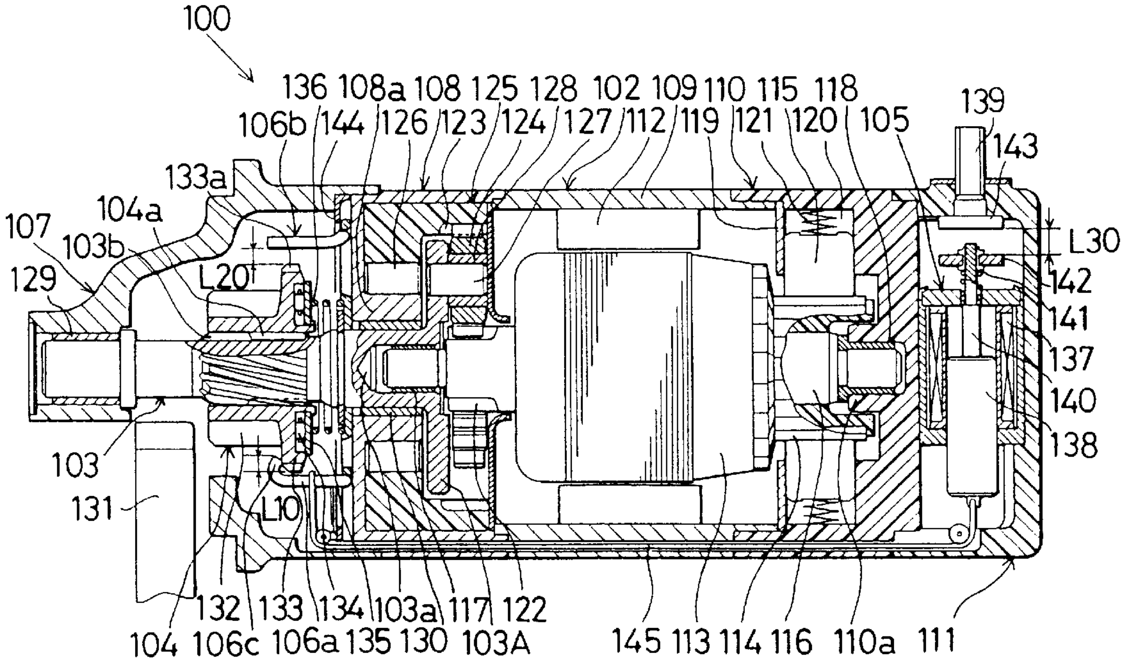
FIG. 21 is a sectional view of a starter according to the fourth embodiment of the present invention.

The lower protrusion 106*a* to which one end of a cord-like connection member 145 is interlocked, is in engagement with a spring 146 (FIG. 23) and is in the state of being normally biased upward in FIG. 21 due to the reaction of the spring 146. It is to be noted that the other end of the cord-like member 145 is interlocked to the bottom of the plunger 138.

While the starter 1 is in the stationary state, spacings L10, L20, and L30 are established so that the following relationship will hold, with L10 representing a hooking distance between the hook 106*c* of the lower protrusion 106*a* of the pinion rotation restricting member 106 and the flange 133 of the pinion moving body 104, L20 representing a distance between the upper protrusion 106*b* of the rotation restricting member 106 and the outer periphery side of the flange 133 of the pinion moving body 104, and L30 representing a distance between the movable contact 142 of the electromagnet switch 105 and both fixed contacts 143.

$L10 \leqq L20 \leqq L30$

Also, length of the upper protrusion 106*b* is set so that even when the pinion moving body 104 subjected to the biasing of the spring 136 moves forward the predetermined distance (for example, when a movement is made to a position whereat the front end side of the pinion gear 132 abuts the rear end side of the ring gear 131 or when a movement is made to the close vicinity of the rear end side of the ring gear 131), the protrusion 106*b* may be kept received in the recesses 133*a* of the flange 133 upon moving downward of the pinion rotation restricting member 106.

Next, operation of this embodiment will be explained.

Upon closing of the key switch, electric current flows from the battery to the attraction coil 137 of the electromagnet switch 105. The attraction coil 137 generates magnetic force to attract the plunger 138 upward in FIG. 21 due to the magnetic force.

With the movement of the plunger 138, the pinion rotation restricting member 6 is pulled through the cord-like member 145 to move downward in FIG. 21 while flexing the spring 146.

When the pinion rotation restricting member 106 moves the predetermined distance L10, the hook 106*c* of the lower protrusion 106*a* disengages from the flange 133 of the pinion moving body 104, releasing the movement restriction on the pinion moving body 104. The pinion moving body 104 is advanced forward toward the ring gear 131 by the biasing of the spring 136.

When the plunger 138 moves further upward and the pinion rotation restricting member 106 moves downward by means of the cord-like member 145, the upper protrusion 106*b* of the pinion rotation restricting member 106 is set into the recesses 133*a* provided on the outer periphery of the flange 133 of the pinion moving body 104, thereby restricting the rotation of the pinion moving body 104.

On the other hand, due to the movement of the plunger 138, the movable contact 142 abuts both fixed contacts 143 to close the motor contact. As a result, the armature 113 starts rotating. After the rotation of the armature 113 is reduced by the reduction gear, the rotation is transmitted to the output shaft 103, which starts rotating.

The rotation of the output shaft 103 causes the pinion moving body 104 to tend to rotate. As the rotation of the pinion moving body 104 is restricted so that the rotation force of the output shaft 103 acts upon the pinion moving body 104 through the helical spline 103*b* as propulsion. This causes the pinion gear 132 to mesh with the ring gear 131 (FIG. 24) so that the rotation force of the starting motor 102 (rotation of the output shaft 103) is transmitted to the ring gear 131 to drive the engine.

Figure 24:
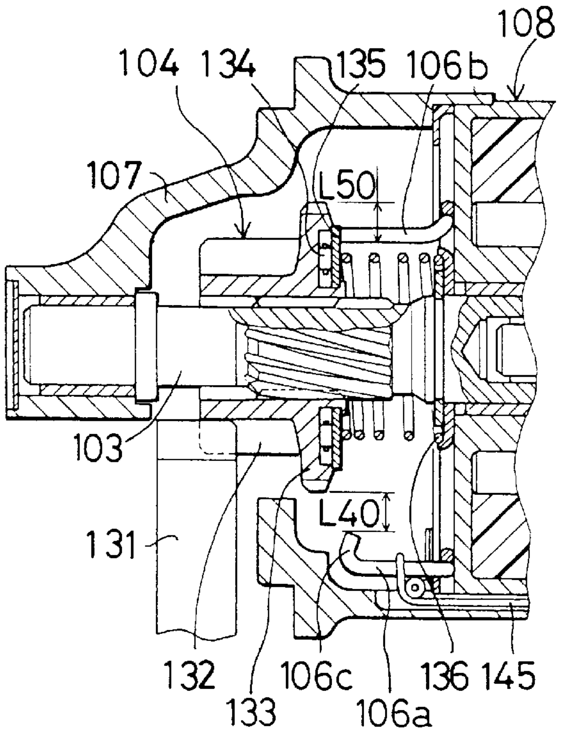
FIG. 24 is a sectional view showing a state of a pinion gear in engagement with a ring gear in the fourth embodiment.

When the pinion gear 132 meshes with the ring gear 131, as shown in FIG. 24, the upper protrusion 106*b* of the pinion rotation restricting member 106 is pulled down in the rear of the washer 135 which is rotatably provided on the rear end side of the pinion moving body 104 to restrict retreat of the pinion moving body 104. Under this condition, a hooking distance from the uppermost outer periphery side of the flange 133 of the pinion moving body 104 to the upper protrusion 106*b* of the pinion rotation restricting member 106 is L50, and a distance from the lowermost outer periphery side of the flange 133 to the hook 106*c* of the lower protrusion 106*a* of the pinion rotation restricting member 106 is L40. The distances L40 and L50 must be set so that the following relationship will hold.

$L50 \leqq L40$

When the key switch is turned off upon completion of starting the engine, the electric current to the attraction coil 137 of the electromagnet switch 137 is interrupted, resulting in the pinion rotation restricting member 106 to be pushed back upward in FIG. 21 by the reaction of the spring 146. As a result, the upper protrusion 106*b* disengages from the washer 135 of the pinion moving body 104 and releases the retreat restriction of the pinion moving body 104.

Since the rotation speed of the ring gear 131 (engine rotation) exceeds that of the pinion gear 132 (rotation of the output shaft 103), a retreating force in reverse direction to the direction of meshing acts in between the helical spline 103*b* of the output shaft 103 and the helical spline 104*a* of the pinion moving body 104. This retreating force causes the pinion moving body 104 to retreat on the output shaft 103 against the spring 136 upon releasing of retreat restriction by the upper protrusion 106*b* of the pinion rotation restricting member 106, releasing the meshing between the ring gear 131 and the pinion gear 132.

Also, when the pinion rotation restricting member 106 moves upward due to the reaction of the spring 146, the plunger 138 is pulled downward in FIG. 21 by the cord-like member 145. Hence, with the downward movement of the plunger 138, the movable contact 142 leaves both fixed contacts 143 and opens the motor contact, thereby stopping current supply to the armature 113 and halting the rotation of the armature 113.

Further, when the pinion moving body 104 retreats to the stationary position (position shown in FIG. 21), the hook 106*c* of the lower protrusion 106*a* of the pinion rotation restricting member 106 which is moving upward engages the front end side of the flange 133 of the pinion moving body 104, resulting in restriction on the advance movement of the pinion moving body 104.

According to this embodiment, inasmuch as the pinion moving body 104 is normally biased by the reaction of the spring 136 toward the ring gear 131, upon releasing of the movement restriction of the pinion moving body 104 by means of the hook 106*c* of the lower protrusion 106*a* of the pinion rotation restricting member 106, the pinion moving body 104 biased by the spring 136 can move over toward the ring gear 131.

This makes it possible to restrict rotation of the pinion moving body 104 while the front end side of the pinion gear 132 is in abutment with the rear end side of the ring gear 131 or while the pinion gear 132 is positioned in close vicinity of the ring gear 131, so that immediately after the armature 113 starts rotating, the pinion gear 132 can mesh with the ring gear 131.

As a result, a substantial abridgment of time from commencement of rotation of the armature 113 to the meshing of the pinion gear 132 with the ring gear 131 is accomplished, thereby enabling the pinion gear 132 to mesh with the ring gear 131 when the rotation speed is low, thus sharply restraining an impact occurring at meshing. Consequently, it is not necessary to increase the rigidity of the rotational force transmission part (each of the gears 122, 123, and 124 of the reduction gear, the output shaft 103 and the like), so that an increase in weight and a larger-scale structure are not necessitated. This brings about significant advantages of size and weight reductions.

Fifth Embodiment

Figure 25:
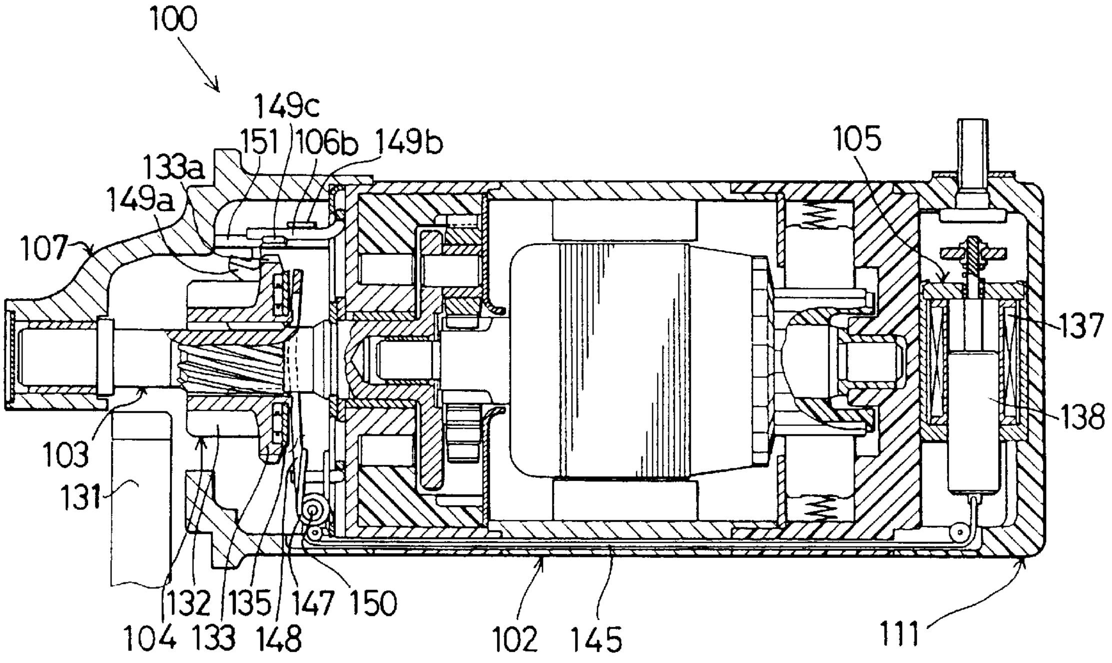
FIG. 25 is a sectional view of a starter according to the fifth embodiment of the present invention.

The starter 1 according to this embodiment includes, as shown in FIG. 25, a lever 148 which pushes the pinion moving body 104 forward by the reaction force of a spring 147, and a restricting member 149 (FIG. 26) which restricts the pinion lever being pushed forward by means of the lever 148.

The lever 148 is disposed in the rear of the washer 135 of the pinion moving body 104 and both ends thereof are pivotally supported about a pivot 150 provided on the plate 144, normally biasing the pinion moving body 104 forward due to the reaction of the spring 147.

Figure 26:
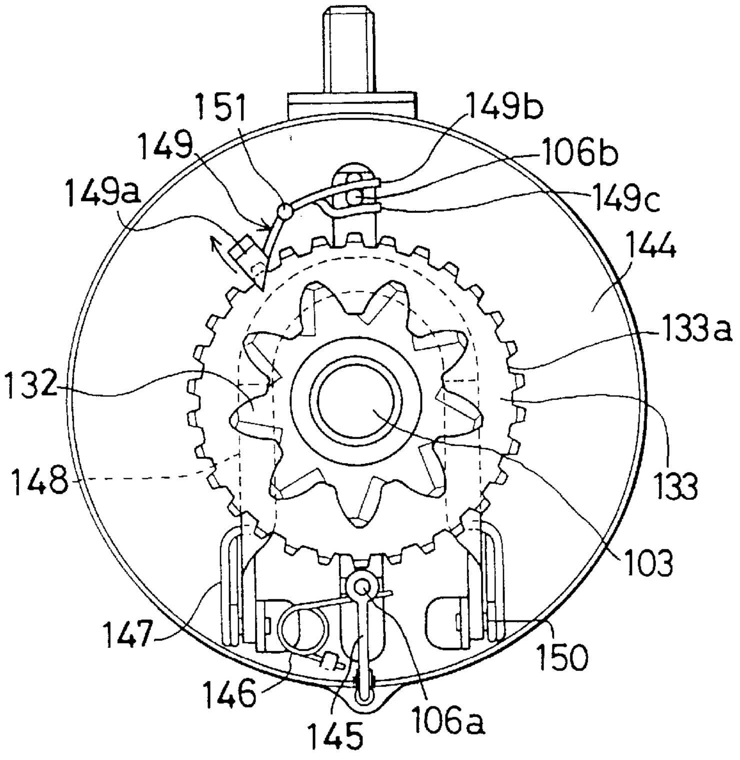
FIG. 26 is a plan view of a pinion moving body as viewed from the front side in the fifth embodiment.

As shown in FIG. 26, the restricting member 149 is pivotally supported about a pivot 151 which is disposed in close vicinity of the pinion rotation restricting member 106 in substantially parallel to the upper protrusion 106*b*, one end thereof having a hook 149*a* in engagement with the front end side of the flange 133 of the pinion moving body 104, and the other end thereof forking into two legs 149*b* and 149*c* to grasp and hold the upper protrusion 106*b* of the pinion rotation restricting member 106 therewith.

Next, operation of this embodiment will be described.

As the attraction coil 137 of the electromagnet switch 105 is turned on to attract the plunger 138 upward in FIG. 25, the pinion rotation restricting member 106 interlocked to the plunger 138 by way of the cord-like member 145 moves downward against the biasing of the spring 146, whereupon the fork legs 149*b* and 149*c* of the restricting member 149 moves following the movement of the upper protrusion 106*b* of the pinion rotation restricting member 106 so that the restricting member 149 pivots relative to the pivot 151 in the direction of arrow in FIG. 26.

This releases the movement restriction on the pinion moving body 104 as the hook 149*a* which has so far engaged the front end side of the flange 133 disengages therefrom, permitting the pinion moving body 104 to advance forward a predetermined distance by way of the lever 148 due to the reaction of the spring 147.

Thereafter, in the same way as in the fourth embodiment, commencement of rotation of the armature 113 while the pinion moving body 104 is in the rotation restriction by the upper protrusion 106*b* of the coil-shaped member 106, leads to the meshing of the pinion gear 132 with the ring gear 131 and the rotational force of the starting motor 102 (rotation of the output shaft 103) is transmitted to the ring gear 131 to drive the engine.

When the pinion gear 132 meshes with the ring gear 131, the upper protrusion 106*b* of the pinion rotation restricting member 106 falls in the rear of the washer 135 provided on the rear end side of the pinion moving body 104 to restrict retreat of the pinion moving body 104.

When the key switch is turned off after start of the engine, current to the attraction coil 137 of the electromagnet switch 105 is shut off and attraction force of the plunger 138 disappears so that the pinion rotation restricting member 106 is pushed upward in FIG. 25 by the reaction of the spring 146.

Accordingly, the upper protrusion 106*b* disengages from the washer 135 of the pinion moving body 104 and releases the retreat restriction on the pinion moving body 104, resulting in the pinion moving body 104 to retreat on the output shaft 103 and releasing the meshing of the ring gear 131 with the pinion gear 132.

The restriction member 149 following the movement of the upper protrusion 106*b* rotates about the pivot 151 in a reverse direction to that when the gears are meshed, whereby the hook 149*a* engages the front end side of the flange 133 of the pinion moving body 104 to perform, again, advance restriction thereof.

In the same way as in the fourth embodiment, according to this embodiment, while the front end side of the pinion gear 132 is in abutment with the rear end side of the ring gear 131 or while the pinion gear 132 is positioned in close vicinity of the ring gear 131, rotation restriction of the pinion moving body 104 is conducted.

Consequently, immediately after the armature 113 starts rotating, the pinion gear 132 can mesh with the ring gear 131, greatly restraining an impact value generating at the time of meshing and resulting in disposing of any need to raise the rigidity of the rotational force transmission part of the starter 100.

Sixth Embodiment

Figure 27:
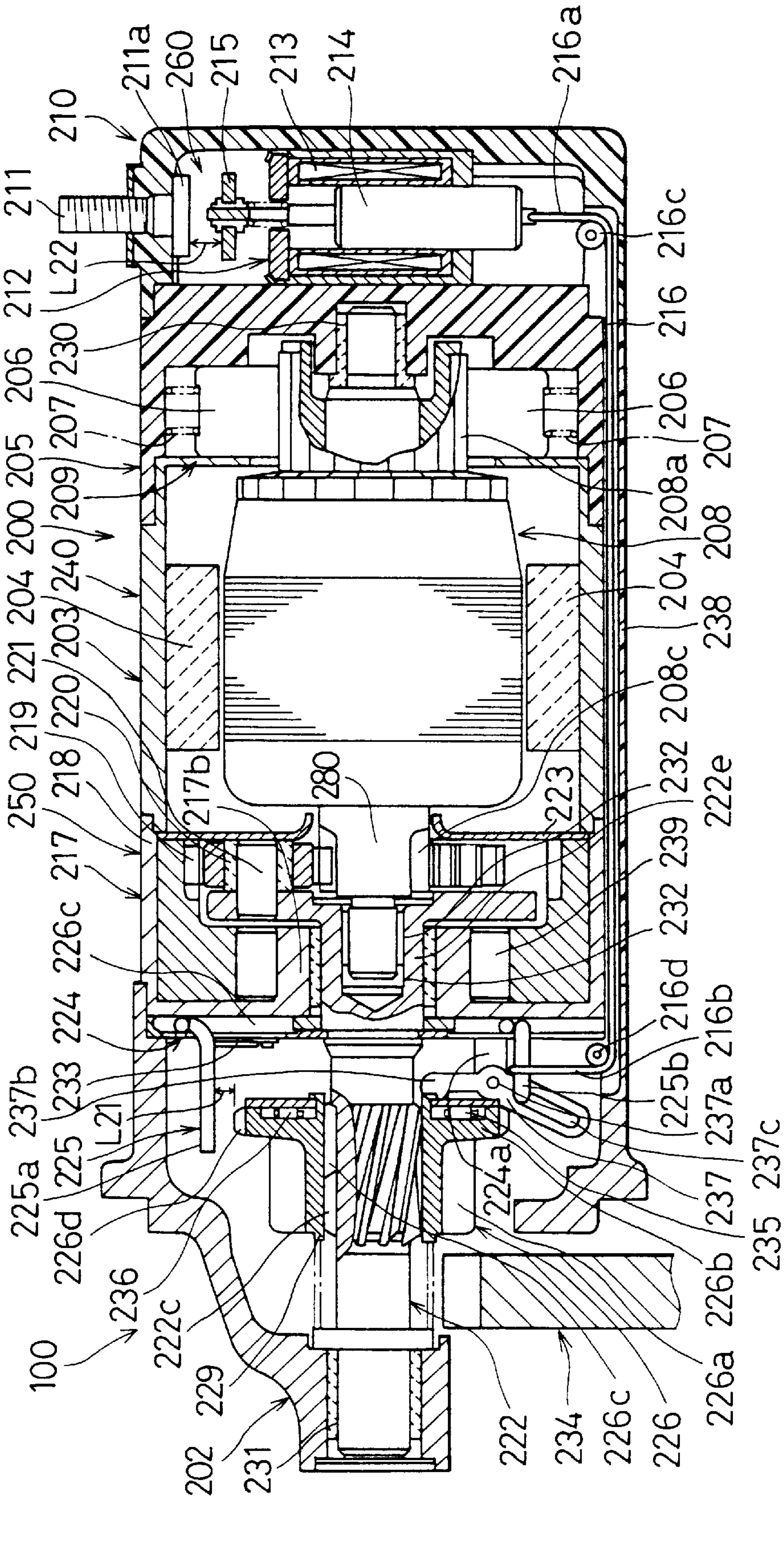
FIG. 27 is a sectional view showing a starter according to the sixth embodiment of the present invention.

In this embodiment, as shown in FIG. 27, a starter 100 has a front casing or housing 202, a center casing 217, a yoke 203, a brush holder 205, and a rear casing 210. Through bolts (not illustrated) are used to couple the front casing 202 and the rear casing 210 sandwiching the center casing 217, the yoke 203 and the brush holder 205 therebetween. The brush holder 205 and the rear casing 210, each being made of an insulating resin molded member and lightweight, has small inertia moment from the front casing 202 to restrict the starter 100 from swinging and vibrating.

Inside the front casing 202 and the center casing 217, an output shaft 222 is rotatably supported by a bearing 231 affixed to the front casing 202 and by a bearing 232 coaxially affixed to an inner cylindrical part 217*b* of the center casing 217.

A torsion or helical spline 222*c* is formed on the outer periphery of the output shaft 222. The helical spline 222*c* of the output shaft 222 is engaged with the helical spline 226*c* formed on the inner periphery of a through hole in the radial center of a pinion moving body 226, which is axially movably held on the output shaft 222.

From the front part to the middle part of the pinion moving body 226 is integrally formed a pinion gear 226*a* which meshes with a ring gear 234 provided of an engine (for example, a crankshaft), while on the rear end flange of the pinion moving body 226 is likewise integrally formed protrusions and recesses 226*d* having an outside diameter larger than that of the pinion gear 226*a*. Moreover, on the rear end side of the pinion moving body 226 is disposed a washer 236 movement of which is restricted axially with respect to the pinion moving body 226 despite being axially and rotatably supported by rollers 235. Thus, a thrust bearing is formed by the rear end flange, the rollers 235 and the washer 236. Also, the pinion moving body 226 is subjected to constant pressing and biasing rearward by a biasing spring (compression coil spring) 229 which is in abutment with the front end side of the pinion moving body 226.

Inside the center casing 217 is housed a planetary reduction gear 250 composed of an internal gear 218, planetary gears 219, and a sun gear 208*c*. That is, the internal gear 218 is fixed in abutment with the inner periphery of the center casing 217, and the planetary gears 19 are in abutment with and in mesh with the internal gear 218. Each planetary gear 219 is supported by a pin 221 relative to each core by way of a bearing 220, each pin 21 being fixed to a flange forming the rear end of the output shaft 222. In the center of each planetary gear 219, there is disposed the sun gear 208*c*, which is formed around the tip of a rotation shaft 280 (armature shaft) of a starting motor 200, meshing with all planetary gears 219. Hence, the speed of rotation of the motor 200 is reduced to about thirty to forty percent via the planetary reduction gear 250, and transmitted the output shaft 222 to the pinion gear 226*a*.

The planetary reduction gear 250 and the motor 200 are separated by a partition 223. In the inner periphery of the front part of the internal gear 218, a one-way clutch is formed by the central cylindrical part 217*b* of the center casing 217 and a plurality of rollers 239 interposed therebetween.

The motor 200 comprises a stator 240 made up of the yoke 203 and a fixed magnetic pole 204, an armature 208 having the rotation shaft 280, and the brush holder 205 holding a plurality of brushes 206. The rotation shaft 280 of the motor 200 is rotatably supported by a bearing 232 fitted into the output shaft 222 and by a bearing 230 fitted into the brush holder 205.

A commutator 208*a* of a cylindrical shape is disposed at the rear of the armature 208 on the rotation shaft 280, whereas each brush 206 held in the brush holder 205 is biased toward the radial center by a spring 207 and is slidably in abutment with the commutator 208*a* by a predetermined pressure to be electrically connected thereto.

Inside the rear casing 210 is located and fixed an electromagnet switch 212 in the upward and downward directions. The electromagnet switch 212 has a movable core or plunger 214 and an electromagnetic attraction coil 213 for magnetically attracting the plunger 214, a movable contact 215 fixed to and held by a rod projecting upward from the plunger 214 on the upper part of the plunger 214.

A battery terminal 11 projects outwardly and is affixed to the upper part of the rear casing 210, while a battery-side fixed contact 211*a* electrically connected to the battery terminal 211 is secured to inside the upper part of the rear casing 210. Inside the rear casing 210, there is a motor-side fixed contact (not illustrated) adjacent to the fixed contact 211*a* with a predetermined distance in between which is electrically connected to the positive-side the brush 206 via coated wire (not illustrated).

A main switch 260 made up of the movable contact 215, fixed contact 211*a*, and another fixed contact (not illustrated) is mounted on the upper part of the inside space of the rear casing 210. When the attraction coil 213 is electrically connected to a battery (not illustrated), the plunger 214 is attracted into the attraction coil 213, the movable contact 215 moving upward with the plunger 214 to electrically connect the fixed contact 211*a* and other fixed contact and the main switch 60 closing to turn on the motor 200. A distance between the movable contact 215 and the fixed contact 211*a* is defined as L22.

One end 216*a* (rear end) of a cord-like member 216 composed of twisted stainless steel wire or the like is connected to the lower end of the plunger 214. The wire cable 216 extends downward from the end 216*a*, changes a direction thereof to forward at a pulley 216*c* rotatably supported by the rear casing 210, passes a groove formed through the lower part of the inside space of the rear casing 210 in the forward and rearward directions, and extends forward. The cord-like member 216, further extending forward along the outer periphery at the bottom of the brush holder 205, the yoke 203, and the center casing 217, is introduced to a groove formed in the bottom of the inside space of the front casing 202 in the forward and rearward directions. To keep the cord-like member 216 from being exposed a cover 238 over a protruding trough is attached to the bottom of the outer periphery lying at the lower part of the brush holder 205, the yoke 203, and the center casing 217, covering the cord-like member 216.

The cord-like member 216 introduced to the front casing 202 changes the direction thereof upward at a pulley 216*d* rotatably supported by the front casing 202 and the other end 216*b* (front end) thereof extends generally upward. The other end 216*b* has a tip connected to a lower protrusion 225*b* of a pinion rotation restricting member 225 which is elastic. Since the pulleys 216*c* and 216*d* have sufficiently deep grooves the outer periphery of which lies in close vicinity to the inside walls of the rear casing 210 and the front casing 202, the cord-like member 216 will not disengage from the pulleys 216*c* and 216*d*, even if slackening should occur.

Figure 28:
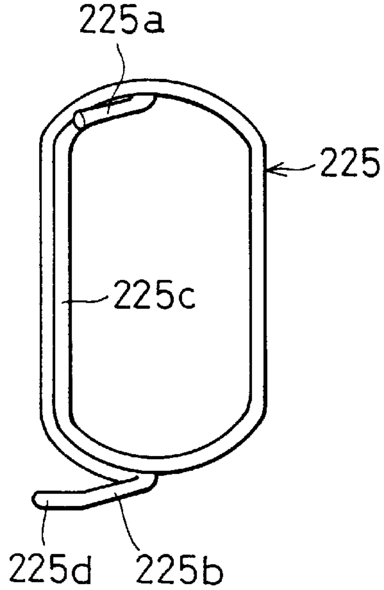
FIG. 28 is a perspective view showing a rotation restricting member used in the sixth embodiment.

The pinion rotation restricting member 225 is formed by bending a wire rod of spring steel or the like as shown in FIG. 28. The restricting member 225 bends at a right angle to the forward direction from the upper and lower ends of the body 225*c* of the generally coil shape, thereby providing an upper protrusion 225*a* and a lower protrusion 225*b*. A front end 225*d* (FIG. 28) of the lower protrusion 225*b* bends at a right angle to the right, forming a horizontal part of a predetermined length.

When the electromagnet switch 212 operates to pull the cord-like member 216, the upper protrusion 225*a* of the pinion rotation restricting member 225 moves downward in a through groove 224*b* (FIG. 27 and FIG. 29) to come into engagement with the protrusions and recesses 226*d* on the outer periphery of the pinion moving body 226 and restrict rotation of the pinion moving body 226. Even if the pinion moving body 226 advances a predetermined distance when the motor 200 is in rotating operation, the axial length of the upper protrusion 225*a* is so determined that it is kept engaged in the recesses 226*d*, until the pinion gear 226*a* meshes with the ring gear 234 in sufficient depth. It is long enough to restrict rotation of the pinion moving body 226. It is to be noted that an interval between the uppermost part of the outer periphery of protrusions and recesses 226*d* of the pinion moving body 226 and the upper protrusion 225*a* is defined as distance L21 which is shorter than the distance L22 in the main switch 260 in the electromagnet switch 212.

On the other hand, the lower protrusion 225*b* of the pinion rotation restricting member 225 has a middle part to which the other end 216*b* of the cord-like member 216 is welded, and the front end 225*d* extends through a groove 237*c* of a lever 237 and engages the lower half of the lever 237.

The upper protrusion 225*a* and the lower protrusion 225*b* extend through grooves 224*b* and 224*c* (FIG. 29) opened in the upper half and the lower half of the plate 224, projecting to the inside space of the front casing 202. Consequently, as shown in FIG. 29, the pinion rotation restricting member 225 is held movably upward and downward along the through grooves 224*b* and 224*c*.

Figure 29:
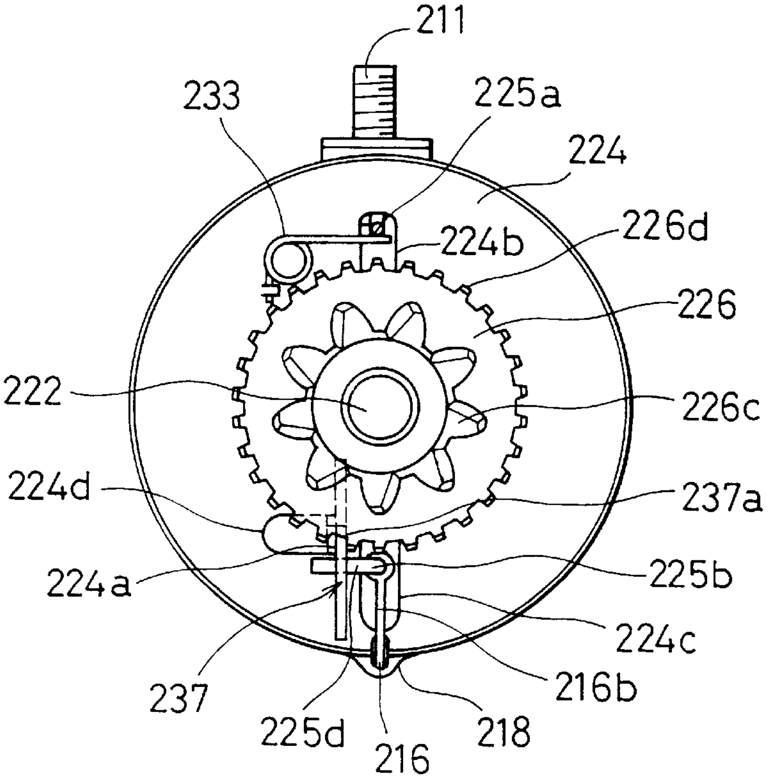
FIG. 29 is a front view of a pinion movement control structure in the sixth embodiment.

Also, as shown in FIG. 29, a spring 233 (helical coil spring) with one end thereof fixed to the front side of the plate 224 pushes and urges the upper protrusion 225*a* upward. Thus, the pinion rotation restricting member 225 is normally biased upward. This means that except during operation of the electromagnet switch 212, the pinion rotation restricting member 225 is located at the upper end of the movable range. It is to be noted that since the coiled body 225*c* is housed in a spacing between the plate 224 and the bottomed part of the center casing 217, tilting of the pinion rotation restricting member 225 in each direction is restricted.

The lever 237 is has a shape in the form of a letter "<" and is formed by steel sheet blanking. The lever 237 is pivotally supported by a pivot 237*a* at the central part where the lever 237 is bent and the pivot 237*a* is held by a strut 224*a* which is set up integrally to project forward from the plate 224. The lower half of the lever 237 is tilted in a direction of putting the lower end slightly forward and the through groove 237*c* is formed in the lower half. The front end 225*d* of the lower protrusion 225*b* of the pinion rotation restricting member 25 extends through the through groove 237*c* and is slidably engaged along the through groove 237*c*.

Figure 30:
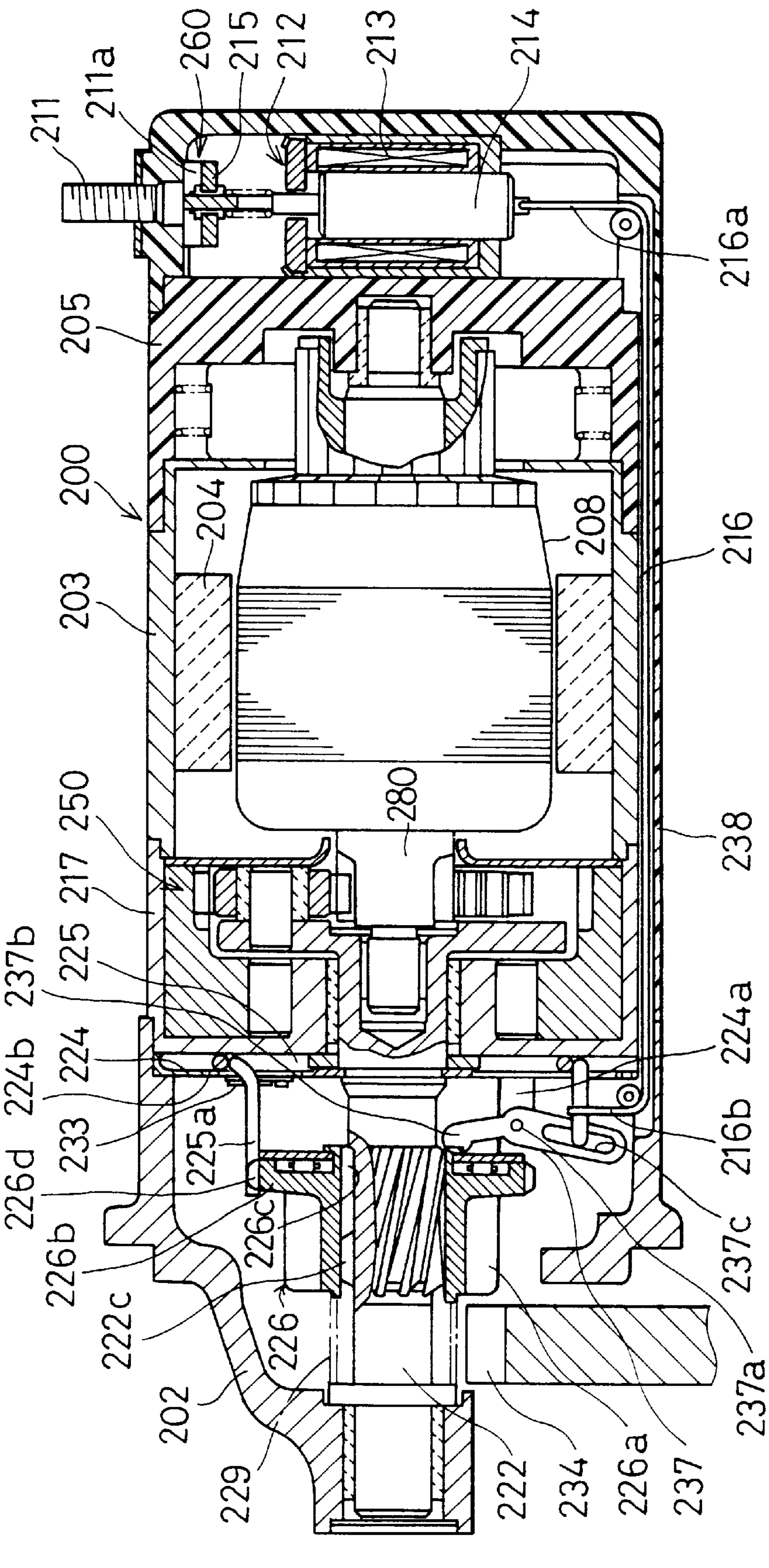
FIG. 30 is a sectional view showing the operation of the starter before starting motor rotation in the sixth embodiment.

Accordingly, as soon as the electromagnet switch 212 operates to pull the pinion rotation restricting member 225 downward, the lower protrusion 225*b* thereof slides along the through groove 237*c* so that the lower half of the lever stands upright. As a result, an upper end 237*b* of the lever 237 located above the pivot 237*a* moves forward with the tilting of the lever 237. Since the upper end 237*b* is in abutment with the washer 236 which makes up the rear end side of the pinion moving body 226, the pinion moving body 226 is pushed by the upper end 237*b* up to the predetermined position ahead, which is, as shown in FIG. 30, the position where the pinion gear 226*a* is about to contact and mesh with the ring gear 234.

It is to be noted that, with the electromagnet switch 212 not operating, the distance L21 between the upper protrusion 225*a* of the pinion rotation restricting member 225 and the flange 226*b* of the pinion moving body 226 is set equal to or shorter than the distance L22 between the fixed contact 211*a* and the movable contact 215. During operation of the electromagnet switch 212, until the pinion rotation restricting member 225 is pulled down and engages the protrusions and recesses 226*d*, the main switch 260 which functions as a motor switch for supplying electric current to the motor 200 will not close.

The starter 100 of this embodiment operates as follows.

When current is supplied to the attraction coil 213 of the electromagnet switch 212 by through a key switch (not illustrated), the plunger 214 is magnetically attracted by the attraction coil 213 and moves upward, the cord-like member 216 is pulled toward the electromagnet switch 212, and the pinion rotation restricting member 225 is pulled down against the biasing of the spring 233 for restricting rotation of the pinion moving body 226. Thereupon, the front end 225*d* of the lower protrusion 225*b* of the pinion rotation restricting member 225 slides downward in the through groove 237*c* of the lever 237 to turn the lever 237 counterclockwise in FIG. 27.

In consequence, the upper end 237*b* of the lever 237 pushes the pinion moving body 226 from the rearmost position and advances the pinion moving body 226 the predetermined distance forward. At that time, the pinion moving body 226 advances while turning along the helical spline 222*c* of the output shaft 222 which is not in rotation yet. The washer 236 attached to the flange through rollers 236 does not turn so that no undue transverse force is applied to the upper end 237*b* of the lever 237. The pinion moving body 226 thus advances closely to the ring gear 234 as shown in FIG. 30. The upper protrusion 225*a* of the pinion rotation restricting member 225 comes into the recesses of the protrusions and recesses 226*d* of the pinion moving body 226, thus restricting rotation of the pinion moving body 226.

Figure 31:
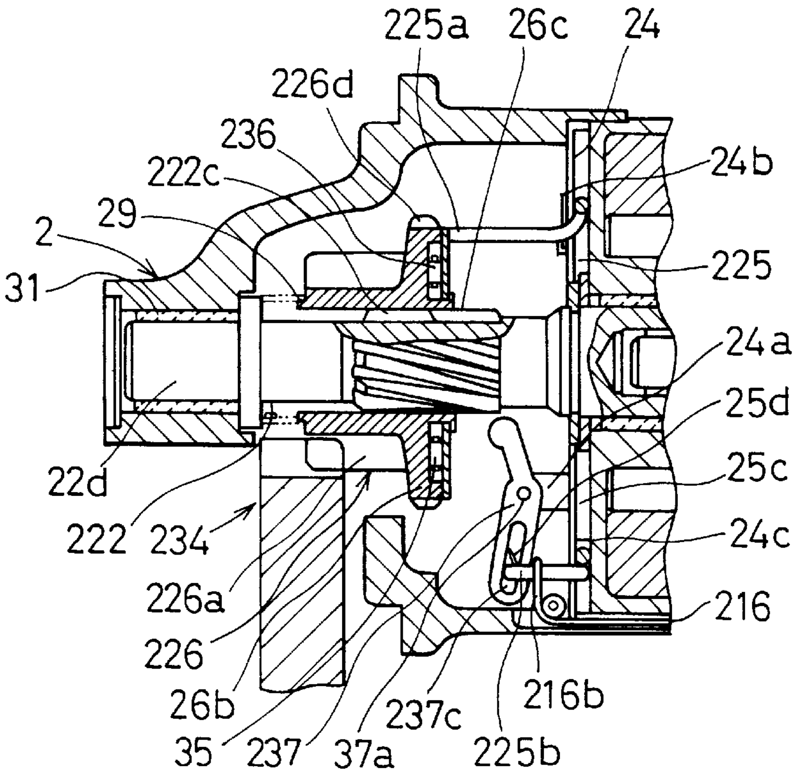
FIG. 31 is a sectional view showing the operation of the starter during starting motor rotation in the sixth embodiment.

After the advance movement of the pinion moving body 226, the movable contact 215 of the main switch 260 abuts the battery-side fixed contact 11*a* and the motor-side fixed contact (not illustrated) to supply the motor 200 with electric current. Thus, the armature 208 starts rotating and rotation of the shaft 280 is reduced by the planetary reduction gear 250 to drive the output shaft 222. However, because rotation of the pinion moving body 226 is restricted by the pinion restricting member 225, the helical spline 222*c* of the output shaft 222 which has begun rotating starts pushing the pinion moving body 226 forward. As a result, pinion gear 226*a* starts meshing with the ring gear 234, and as shown in FIG. 31, upon reaching a predetermined meshing depth, the upper protrusion 225*a* of the pinion rotation restricting member 225 disengages from the protrusions and recesses 226*d* of the pinion moving body 226, thus releasing rotational restriction. Subsequently, the upper protrusion 225*a* moves slightly downward by the spring elasticity of the pinion rotation restricting member 225 and contacts the washer

236, thereby acting also to restrict retreat of the pinion moving body 226.

When the upper protrusion 225*a* disengages from the protrusions and recesses 226*d* to release rotational restriction in this manner, the pinion moving body 226, driven by the output shaft 222, starts rotating and begins driving the ring gear 234 for engine starting. Thereupon, a torque from the output shaft 222 acting on the pinion moving body 226 will exert a strong force due to drive of the motor 200 in pushing the pinion moving body 226 forward along the spline 222*c*.

Conversely, when the key switch is turned off after the engine starting, the attraction coil 213 is deenergized and magnetic force attracting the plunger 214 upward disappears. Thus, the plunger 214 returns downward, disabling the cord-like member 216 to pull the rotation restricting member 225 down. The pinion rotation restricting member 225 return upward by the spring elasticity of the spring 233, causing the upper protrusion 225*a* to leave the rear of the pinion moving body 226 and thus releasing retreat restriction of the pinion moving body 226.

Simultaneously with the return of the pinion rotation restricting member 225, the lever 237 also returns to the initial position, while the lower protrusion 225*b* of the pinion rotation restricting member 225 likewise takes a sliding course along the through groove 237*c* of the lever 237. Concomitant to return of the pinion rotation restricting member 225, the cord-like member 216 returns to the initial position with the plunger 214.

In this embodiment, the motor switch 260 closes to turn on the motor 200, after the pinion moving body 226 has already moved closely to the ring gear 234. Therefore, immediately after the output shaft 222 begins rotating and the pinion gear 226*a* starts further moving, the pinion gear 226*a* meshes with the ring gear 234. There passes only a short period of time from the beginning of rotating of the output shaft 222 until the beginning of meshing with the ring gear 234, the speed of rotation of the output shaft 222 is still low so that the pinion gear 226*a* comparatively slowly meshes with the ring gear 234. In consequence, meshing impact becomes slight, greatly reducing the impact load upon the driving system including the planetary reduction gear 250. Further, meshing engagement of the pinion gear 226*a* with the ring gear 234 under low speed condition will reduce chipping of the teeth of both gears 226*a* and 234.

When the motor 200 is turned on and the output shaft 222 starts rotating, rotation of the pinion moving body 226 is kept restricted. Hence, for a short period after the output shaft 222 starts rotating, the pinion moving body 226 will not rotate so that through operation of the slipping on of the helical spline, the pinion moving body 226 is powerfully pushed out until meshing with the ring gear 234.

Moreover, the pinion rotation restricting member 225 and the lever 237 are in an integral structure and driven by the single movement of the plunger 214 of the electromagnet switch 12. Consequently, there is an advantage of even more improved reliability in operation at the time of the meshing of the pinion gear with the ring gear.

Seventh Embodiment

Figure 32:
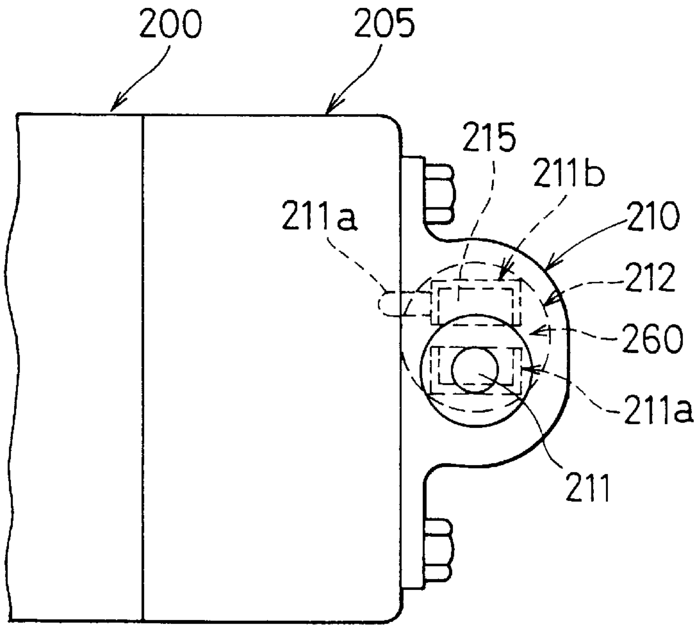
FIG. 32 is a plan view of a starter according to the seventh embodiment of the present invention.

In this embodiment, as shown in FIG. 32, the rear casing 210 is shaped into a slim planar shape. That is, the inside space of the casing 210 is reduced to have a space housing mostly the electromagnet switch 212. The rear casing 210 which is secured to the brush holder 205 has a volume considerably decreased from that of the sixth embodiment. Since this means a weight reduction at a part of the longest moment arm from the starter mounting part which results in a considerable decrease of inertia moment, there is an advantage of further reduction in swinging vibration of the starter.

The foregoing embodiments are not restrictive but may be modified or altered in many other ways without departing from the spirit and the scope of the invention.

What is claimed is:

1. A starter comprising:

a starting motor for generating rotation force;

an output shaft for rotating as driven by the starting motor;

a pinion moving body fitted movably on the output shaft through helical splines, the pinion moving body having a pinion gear on a front part thereof for meshing with a ring gear of an engine and having protrusions and recesses on an entire periphery of a rear part thereof;

a rotation restricting member having an engagement part engageable with the protrusions and recesses to elastically restrict rotation of the pinion moving body while the engagement part is in engagement with the protrusions and recesses;

moving means to move the engagement part of the rotation restricting member to the protrusions and recesses; and disengaging means to disengage the engagement part from the protrusions and recesses upon rotation of the pinion moving body by a predetermined angle while the engagement part is in engagement therewith.

2. A starter as claimed in claim 1, wherein:

the disengaging means has a guide surface guiding the engagement part radially from the protrusions and recesses to an outside with rotation of the pinion moving body.

3. A starter as claimed in claim 1, wherein:

the protrusions and recesses have chamfers formed at least on rotational direction sides of the pinion moving body at the rear end.

4. A starter as claimed in claim 1, wherein:

the disengaging means is coupled with the pinion moving body to move therewith.

5. A starter as claimed in claim 1, further comprising:

retreat restricting means to restrict retreat of the pinion moving body after advancing a predetermined distance toward the ring gear, the retreat restricting means providing the disengaging means integrally therewith.

6. A starter as claimed in claim 1, wherein:

the disengaging means is provided separately from the rotation restricting member.

7. A starter as claimed in claim 1, wherein:

the disengaging means has a part which contacts the engagement part after the pinion moving body rotates the predetermined angle and thereafter guides the engagement part to move in generally a radially outward direction.

8. A starter as claimed in claim 1, wherein:

the disengaging means has a part which moves the engagement part away from the pinion moving body before the meshing of the pinion gear with the ring gear.

9. A starter as claimed in claim 1, wherein:

the engagement part is disengageable from the protrusions and recesses in an axial direction when the pinion moving body moves in the axial direction and meshes with the ring gear; and the engagement part is disengageable from the protrusions and recesses in a radial direction by the disengaging means when the pinion moving body rotates the predetermined angle irrespective of a distance of axial movement of the pinion moving body.

10. A starter comprising:

a starting motor for generating rotation force;

an output shaft for rotating by transmission of the rotation force of the starting motor;

a pinion moving body spline fitted on an outer periphery of the output shaft and having a pinion gear for meshing with a ring gear of an engine;

biasing means to bias the pinion moving body toward the ring gear;

movement restricting means to normally restrict movement of the pinion moving body toward the ring gear by the biasing means;

restriction releasing means to release the movement restriction on the pinion moving body by the movement restricting means before rotation of the output shaft;

rotation restricting means to restrict rotation of the pinion moving body upon movement of the pinion moving body to a predetermined position near the ring gear by the biasing means after the movement restriction of the pinion moving is released by the restriction releasing means; and an electromagnet switch for supplying electric current to the starting motor after rotation of the pinion moving body is restricted by the rotation restricting means.

11. A starter as claimed in claim 10, wherein:

the restriction releasing means includes a coupling member connected to the movement restricting means and the electromagnet switch.

12. A starter as claimed in claim 10, wherein:

the rotation restricting means interlocks to the movement restricting means.

13. A starter as claimed in claim 10, wherein:

the electromagnet switch is disposed on an opposite side of the pinion moving body of the starting motor.

14. A starter as claimed in claim 10, wherein:

the movement restricting means and the rotation restricting means are formed integrally in a single elastic member.

15. A starter comprising:

a starting motor generating rotational driving force upon supply of electric current;

an output shaft having a helical spline formed on an outer periphery thereof;

a pinion moving body including a pinion gear for meshing with a ring gear of an engine and axially movably supported on the output shaft;

pinion moving structure for transferring the pinion moving body a predetermined distance toward the ring gear before the motor begins rotating; and an electromagnet switch having an attraction coil, a plunger movable to drive the pinion moving structure, and a motor switch responsive to the movement of the plunger, the motor switch supplying electric current to the motor after a transfer of the pinion moving body by the pinion moving structure toward the ring gear so that upon commencement of rotation of the motor the pinion moving body is advanced via helical splines to engage the ring gear.

16. A starter as claimed in claim 15, further comprising:

rotation restricting structure for restricting rotation of the pinion moving body upon commencement of rotation of the motor.

17. A starter as claimed in claim 16, wherein:

the pinion moving structure and the rotation restricting structure are operatively linked to each other to be driven together by a single movement of the plunger before rotation of the motor.

18. A starter as claimed in claim 15, wherein:

the pinion moving structure includes a lever tiltably supported about a fulcrum, the lever having one part linked with the plunger and another part abutting the pinion moving body.

19. A starter comprising:

a starting motor generating rotational driving force upon supply of electric current;

an output shaft having a helical spline formed on an outer periphery thereof;

a pinion moving body including a pinion gear for meshing with a ring gear of an engine and axially movably supported on the output shaft;

pinion moving structure for transferring the pinion moving body a predetermined distance toward the ring gear;

an electromagnet switch having an attraction coil, a plunger movable to drive the pinion moving structure, and a motor switch responsive to the movement of the plunger, the motor switch supplying electric current to the motor after a transfer of the pinion moving body by the pinion moving structure toward the ring gear so that upon commencement of rotation of the motor the pinion moving body is advanced via helical splines to engage the ring gear; and a rotation restricting structure for restricting rotation of the pinion moving body upon commencement of rotation of the motor, wherein the pinion moving body includes protrusions and recesses formed alternately radially on an outer periphery thereof;

the rotation restricting structure has a first protrusion of a bar shape restricting rotation of the pinion moving body in engagement with the protrusions and recesses so that the first protrusion meshes with the protrusions and recesses as a result of the rotation restricting member being driven by movement of the plunger; and the rotation restricting structure has a second protrusion slidably engaged with a groove formed in the lever so that the second protrusion slides along the groove to tilt the lever for pushing out the pinion moving body toward the ring gear.

20. A starter comprising:

a starting motor;

an output shaft rotatable by the starting motor;

a pinion moving body axially movable on the output shaft and rotatable with the output shaft, the pinion moving body having a pinion gear for meshing with a ring gear of an engine;

an electromagnet switch having a plunger arranged to move a first predetermined distance to turn on a motor switch through which electric current is supplied to the starting motor;

movement restricting structure for normally restricting axial movement of the pinion moving body on the output shaft;

pinion moving structure for moving the pinion moving body axially on the output shaft toward the ring gear in response to movement of the plunger;

rotation restricting structure linked with the plunger to move a second predetermined distance for engagement with the pinion moving body so that rotation of the pinion moving body is restricted at the time of meshing of the pinion gear with the ring gear; and the first predetermined distance being set longer than the second predetermined distance so that the electromagnet switch enables rotation of starting motor only after movement of the pinion moving body toward the ring gear.

* * * * *